US011049467B2

(12) United States Patent
Fujikawa

(10) Patent No.: US 11,049,467 B2
(45) Date of Patent: *Jun. 29, 2021

(54) ACTIVE MATRIX SUBSTRATE AND DISPLAY DEVICE

(71) Applicant: Sharp Kabushiki Kaisha, Sakai (JP)

(72) Inventor: Yohsuke Fujikawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,877

(22) Filed: Mar. 27, 2020

(65) Prior Publication Data

US 2020/0226991 A1 Jul. 16, 2020

Related U.S. Application Data

(63) Continuation of application No. 16/455,830, filed on Jun. 28, 2019, now Pat. No. 10,643,560, which is a continuation of application No. 16/059,080, filed on Aug. 9, 2018, now Pat. No. 10,388,238, which is a continuation of application No. 15/832,850, filed on
(Continued)

(30) Foreign Application Priority Data

Jan. 21, 2013 (JP) ................................. 2013-008254

(51) Int. Cl.
*G09G 3/36* (2006.01)
*G02F 1/1345* (2006.01)
*G02F 1/1362* (2006.01)

(52) U.S. Cl.
CPC ......... *G09G 3/3648* (2013.01); *G02F 1/1345* (2013.01); *G02F 1/13452* (2013.01); *G02F 1/136286* (2013.01); *G09G 2310/0202* (2013.01)

(58) Field of Classification Search
CPC .......... G09G 3/3648; G09G 2310/0202; G02F 1/1345; G02F 1/13452; G02F 1/136286
See application file for complete search history.

(56) References Cited

U.S. PATENT DOCUMENTS

2006/0138461 A1\* 6/2006 Abe .................. G02F 1/136286
257/202
2010/0118250 A1\* 5/2010 Fujikawa .............. G02F 1/1345
349/139

(Continued)

OTHER PUBLICATIONS

Fujikawa, "Active Matrix Substrate and Display Device", U.S. Appl. No. 16/455,830, filed Jun. 28, 2019.

*Primary Examiner* — Amare Mangistu
*Assistant Examiner* — Jennifer L Zubajlo
(74) *Attorney, Agent, or Firm* — Keating & Bennett, LLP

(57) ABSTRACT

An active matrix substrate includes a plurality of signal lines, each of which includes first and second line portions and an inner connection portion (connection portion) that connects the first and second line portions. The first and second line portions of one of two adjacent signal lines are made of first and second conductive layers, respectively, and the first and second line portions of the other of the two adjacent signal lines are made of second and first conductive layers, respectively. The position of the connection portion of each of the signal lines is determined in accordance with the layout position of that signal line in the line region.

8 Claims, 23 Drawing Sheets

Related U.S. Application Data

Dec. 6, 2017, now Pat. No. 10,083,667, which is a continuation of application No. 14/761,349, filed as application No. PCT/JP2014/050696 on Jan. 16, 2014, now Pat. No. 9,870,744.

(56) References Cited

U.S. PATENT DOCUMENTS

| | | | |
|---|---|---|---|
| 2010/0321624 A1* | 12/2010 | Yanagisawa | G02F 1/1345 349/152 |
| 2011/0075089 A1* | 3/2011 | Jheng | G09G 3/20 349/152 |
| 2012/0081410 A1* | 4/2012 | Yeo | G09G 3/2092 345/690 |
| 2012/0146972 A1* | 6/2012 | Fujikawa | G02F 1/13452 345/206 |
| 2012/0235713 A1* | 9/2012 | Mori | H05K 1/0289 327/109 |
| 2015/0022770 A1* | 1/2015 | Yamaguchi | H01L 27/124 349/139 |
| 2015/0302815 A1* | 10/2015 | Marushima | G02F 1/13452 345/3.2 |
| 2016/0365062 A1* | 12/2016 | Wu | G09G 3/20 |
| 2020/0074955 A1* | 3/2020 | Fujikawa | G02F 1/1345 |

* cited by examiner

ACTIVE MATRIX SUBSTRATE AND DISPLAY DEVICE

TECHNICAL FIELD

The present invention relates to an active matrix substrate including a plurality of data lines and a plurality of scanning lines that are arranged in a matrix, and a display device using the active matrix substrate.

BACKGROUND ART

In recent years, e.g., a liquid crystal display device has been widely used for electrical equipment, including a liquid crystal television, a monitor, a portable telephone, a digital camera, and an information terminal, as a flat panel display (display cell) having features such as small thickness and light weight compared to a conventional Braun tube. In the liquid crystal display device, it is known to use an active matrix substrate for a liquid crystal panel (display panel). The active matrix substrate includes the following: a plurality of data lines (source lines) and a plurality of gate lines (scanning lines) that are arranged in a matrix; switching elements such as thin film transistors (TFTs) that are provided in the vicinity of each of the intersections of the data lines and the scanning lines; and pixels that are arranged in a matrix and include pixel electrodes connected to the switching elements.

There is a growing demand for the display cell to have high resolution or small size. In the display cell, many lines are routed to terminals from one side of a matrix region in which the data lines and the scanning lines are arranged in a matrix (i.e., a pixel array in which the pixels are arranged in a matrix). It is desirable that these lines be within a predetermined area. In other words, it is desirable that a portion that surrounds the display cell and does not affect display, which is called a frame, be reduced.

In order to reduce the frame around the display cell, an active matrix substrate includes a scanning signal drive circuit (gate driver) that is monolithically formed on a base material (low-temperature polycrystalline silicon) of the substrate. This configuration can reduce the frame other than the portion located on the terminal side in which the terminals are provided.

On the other hand, lines called video signal lines are connected to the data lines and routed in the frame on the terminal side. However, it is difficult to reduce this frame on the terminal side, since the number of lines is very large compared to the monolithic circuit element. Therefore, in the conventional active matrix substrate, proposals have been made mainly to improve the line width, line pitch, and wiring structure of the video signal lines.

Specifically in the conventional active matrix substrate, as described in Patent Document 1 or Patent Document 2, the video signal lines are composed of two different conductive layers, i.e., a lower-layer metal film and an upper-layer metal film, so that the video signal lines can be routed at a narrower pitch.

Moreover, in the conventional active matrix substrate, the video signal lines are laid in a line region between the matrix region and a terminal region in which the terminals are arranged, and the line region is defined so that the line pitch becomes narrower in the direction from the matrix region to the terminal region (i.e., the video signal lines are routed to converge in a fan shape). The size of the terminal region is smaller than that of one side of the matrix region. Thus, the FPC or data driver (driver IC) connected to the terminals in the terminal region can be reduced in size. This may result in a reduction in cost of the members such as the FPC and the driver IC.

PRIOR ART DOCUMENTS

Patent Documents

Patent Document 1: JP H05 (1993)-19282 A
Patent Document 2: JP H05 (1993)-150263 A

DISCLOSURE OF INVENTION

Problem to be Solved by the Invention

However, in the conventional active matrix substrate as described above, it is probable that a change in resistance of two adjacent video signal lines (signal lines) may be increased. Consequently such a change in resistance can cause display unevenness to be visually identified when the conventional active matrix substrate is used, e.g., in a liquid crystal display device.

Specifically in order to efficiently lay the video signal lines in the line region with the line pitch becoming narrower, one of two adjacent video signal lines is made of a lower-layer metal film (first conductive layer) and the other is made of an upper-layer metal film (second conductive layer). The lower-layer metal film and the upper-layer metal film differ in sheet resistance. Therefore, in the conventional active matrix substrate, a change in resistance of two adjacent video signal lines may be increased depending on the magnitude of each sheet resistance or the size (e.g., length) of the video signal lines.

With the foregoing in mind, it is an object of the present invention to provide an active matrix substrate in which a plurality of signal lines are laid with the line pitch becoming narrower, and a change in resistance of two adjacent signal lines is small even if each of the signal lines includes two conductive layers that differ in sheet resistance, and a display device using the active matrix substrate.

Means for Solving Problem

To achieve the above object, an active matrix substrate of the present invention includes the following: a plurality of data lines and a plurality of scanning lines that are arranged in a matrix; switching elements that are provided in accordance with each of intersections of the plurality of data lines and the plurality of scanning lines; and pixels that include pixel electrodes connected to the switching elements. A plurality of terminals are provided to input external signals to the plurality of data lines or the plurality of scanning lines. A plurality of signal lines are laid in a line region between a matrix region in which the plurality of data lines and the plurality of scanning lines are arranged in a matrix and a terminal region in which the plurality of terminals are arranged, and the line region is defined so that a line pitch becomes narrower in a direction from the matrix region to the terminal region. One end of each of the plurality of signal lines is connected to drive the data line or the scanning line, and the other end is connected to the terminal. Each of the plurality of signal lines includes a first line portion provided on the matrix region side, a second line portion provided on the terminal region side, and a connection portion that connects the first line portion and the second line portion. The first line portion and the second line portion of one of two adjacent signal lines of the plurality of signal lines are made of a first conductive layer and a second conductive layer, respectively which are different from each other, and the first line portion and the second line portion of the other of the two adjacent signal lines are made of the second conductive layer and the first conductive layer, respectively. A position of the connection portion of each of the plurality of signal lines is determined in accordance with a layout position of that signal line in the line region.

In the active matrix substrate having the above configuration, the signal lines are laid in the line region between the matrix region and the terminal region, and the line region is defined so that the line pitch becomes narrower in the direction from the matrix region to the terminal region. Each of the signal lines includes the first line portion provided on the matrix region side, the second line portion provided on the terminal region side, and the connection portion that connects the first line portion and the second line portion. In the signal lines, the first line portion and the second line portion of one of two adjacent signal lines are made of the first conductive layer and the second conductive layer, respectively which are different from each other, and the first line portion and the second line portion of the other of the two adjacent signal lines are made of the second conductive layer and the first conductive layer, respectively. Moreover, the position of the connection portion of each of the signal lines is determined in accordance with the layout position of that signal line in the line region. Thus, unlike the conventional examples, the present invention can provide the active matrix substrate in which the signal lines are laid with the line pitch becoming narrower, and a change in resistance of two adjacent signal lines is small even if each of the signal lines includes two conductive layers that differ in sheet resistance.

In the active matrix substrate, it is preferable that the position of the connection portion of each of the plurality of signal lines is determined so that a length of the first line portion is equal to that of the second line portion.

This configuration can minimize a difference in resistance between two adjacent signal lines of the signal lines.

In the active matrix substrate, the plurality of signal lines may be laid in the line region so as to belong to any of a first line group, a second line group, and a third line group that are arranged in descending order of interconnection length in the line region. In the first line group, a plurality of the connection portions may be arranged parallel to one side of the matrix region. In the second line group, a plurality of the connection portions may be arranged at a predetermined angle with respect to one side of the matrix region so as to gradually get closer to the matrix region. In the third line group, a plurality of the connection portions may be arranged at a predetermined angle with respect to one side of the matrix region so as to gradually move away from the matrix region.

In this case, the connection portion can be located in the position that makes the length of the first line portion equal to that of the second line portion of each of the signal lines of the first to third line groups. Therefore, a difference in resistance between two adjacent signal lines can be minimized.

In the active matrix substrate, it is preferable that the following formulas (1) to (4) are satisfied:

$$Pa=Pai \quad (1)$$

$$Pb>Pbi \quad (2)$$

$$Pc>Pci \quad (3)$$

$$Pa=Pb=Pc \quad (4)$$

where Pa represents an arrangement interval at one end on the matrix region side and Pai represents an arrangement interval of the connection portions in the first line group, Pb represents an arrangement interval at one end on the matrix region side and Pbi represents an arrangement interval of the connection portions in the second line group, and Pc represents an arrangement interval at one end of the matrix region side and Pci represents an arrangement interval of the connection portions in the third line group.

In this case, the directions in which the signal lines of the first to third line groups are drawn from the matrix region side can be aligned with each other, and thus the signal lines can be easily laid parallel to each other.

In the active matrix substrate, it is preferable that the following formulas (5) and (6) are satisfied:

$$\theta a1=\theta b1=\theta c1=\theta a2=\theta b2 \quad (5)$$

$$\theta c2=90° \quad (6)$$

where $\theta a1$ represents an angle of the first line portion with respect to one side of the matrix region and $\theta a2$ represents an angle of the second line portion with respect to one side of the matrix region in the first line group, $\theta b1$ represents an angle of the first line portion with respect to one side of the matrix region and $\theta b2$ represents an angle of the second line portion with respect to one side of the matrix region in the second line group, and $\theta c1$ represents an angle of the first line portion with respect to one side of the matrix region and $\theta c2$ represents an angle of the second line portion with respect to one side of the matrix region in the third line group.

In this case, the signal lines of the first to third line groups can be laid parallel to each other, and thus the efficiency in the layout of the routing can be easily improved.

In the active matrix substrate, it is preferable that the following formula (7) is satisfied:

$$Pa=Pab=Pb=Pbc=Pc \quad (7)$$

where Pab represents an arrangement interval at one end on the matrix region side in a boundary between the first line group and the second line group, and Pbc represents an arrangement interval at one end on the matrix region side in a boundary between the second line group and the third line group.

This can prevent an unnecessary empty space from being formed in the boundary between the first line group and the second line group and in the boundary between the second line group and the third line group.

In the active matrix substrate, it is preferable that the following formula (8) is satisfied:

$$Pai \neq Pabi \neq Pbi \quad (8)$$

where Pabi represents an arrangement interval of the connection portions in a boundary between the first line group and the second line group.

In this case, the positioning of the connection portions of the first line group and the second line group can be performed independently of each other, and thus the degree of freedom of routing of the signal lines can be ensured.

In the active matrix substrate, it is preferable that the following formula (9) is satisfied:

$$Pbi \neq Pbci \neq Pci \quad (9)$$

where Pbci represents an arrangement interval of the connection portions in a boundary between the second line group and the third line group.

In this case, the positioning of the connection portions of the second line group and the third line group can be performed independently of each other, and thus the degree of freedom of routing of the signal lines can be ensured.

In the active matrix substrate, each of the plurality of signal lines may include an outer line that is made of one of the first conductive layer and the second conductive layer and is provided between the second line portion and the terminal. When the second line portion is made of the other of the first conductive layer and the second conductive layer, the second line portion may be connected to the outer line via an outer connection portion. A plurality of the outer connection portions may be arranged parallel to one side of the matrix region.

In this case, the outer connection portions are arranged on a straight line. Therefore, if, e.g., a sealing material is provided above the outer connection portions, the sealing material can be easily formed.

In the active matrix substrate, it is preferable that the following formula (10) is satisfied:

$$Pci = Pic \tag{10}$$

where Pic represents an arrangement interval of the terminals.

In this case, even if the outer lines are provided, the directions in which the signal lines of the first to third line groups are drawn from the matrix region side can be aligned with each other, and thus the signal lines can be easily laid parallel to each other. Therefore, a thin film material that is not suitable for exposure to the outside of the sealing material can be used as the first conductive layer and the second conductive layer.

In the active matrix substrate, the plurality of signal lines may be video signal lines connected to the data lines.

In this case, it is easy to reduce the size of the data driver that is to be connected to the video signal lines, and also to reduce the power consumption of a display device using this active matrix substrate.

In the active matrix substrate, it is preferable that the first line portion is made of the same conductive layer as one of the data line and the scanning line, and the second line portion is made of the same conductive layer as the other of the data line and the scanning line.

This can prevent an increase in the number of manufacturing processes of the active matrix substrate.

A display device of the present invention uses any of the above active matrix substrates.

The above display device uses the active matrix substrate in which a plurality of signal lines are laid with the line pitch becoming narrower, and a change in resistance of two adjacent signal lines is small even if each of the signal lines includes two conductive layers that differ in sheet resistance. Therefore, a compact display device with excellent display quality can be easily provided.

Effects of the Invention

The present invention can provide an active matrix substrate in which a plurality of signal lines are laid with the line pitch becoming narrower, and a change in resistance of two adjacent signal lines is small even if each of the signal lines includes two conductive layers that differ in sheet resistance, and a display device using the active matrix substrate.

BRIEF DESCRIPTION OF DRAWINGS

FIG. 10(*b*) is a cross-sectional view taken along the line Xb-Xb in FIG. 9.

FIG. 10(*c*) is a cross-sectional view taken along the line Xc-Xc in FIG. 9.

FIG. 12(*b*) is a cross-sectional view taken along the line XIIb-XIIb in FIG. 11. FIG. 12(*c*) is a cross-sectional view taken along the line XIIc-XIIc in FIG. 11.

FIG. 14(*b*) is a cross-sectional view taken along the line XIVb-XIVb in FIG. 13. FIG. 14(*c*) is a cross-sectional view taken along the line XIVc-XIVc in FIG. 13.

FIG. 16(*b*) is a cross-sectional view taken along the line XVIb-XVIb in FIG. 15. FIG. 16(*c*) is a cross-sectional view taken along the line XVIc-XVIc in FIG. 15.

FIG. 18(*b*) is a cross-sectional view taken along the line XVIIIb-XVIIIb in FIG. 17. FIG. 18(*c*) is a cross-sectional view taken along the line XVIIIc-XVIIIc in FIG. 17.

DESCRIPTION OF THE INVENTION

Figure 1:
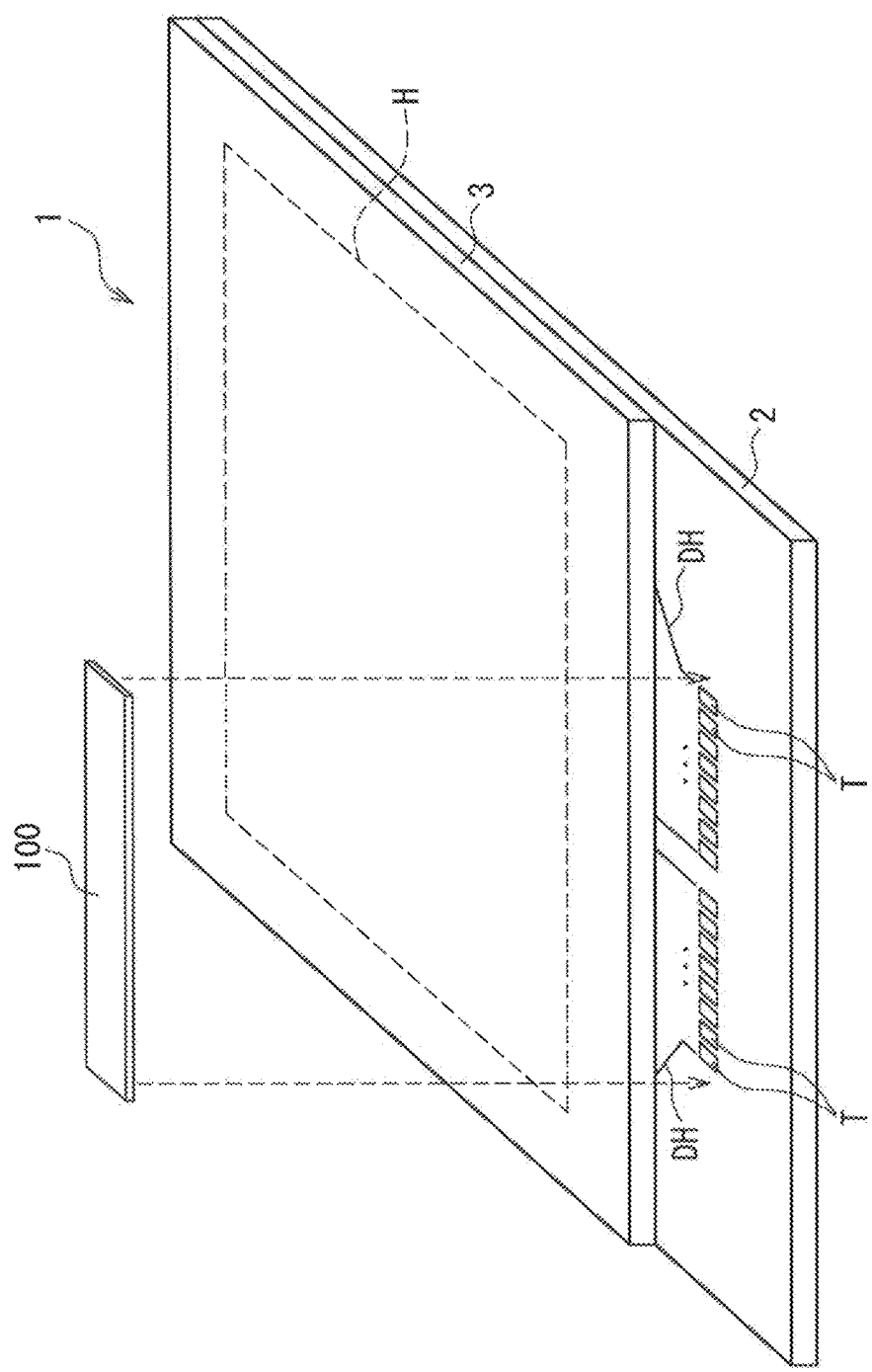
FIG. 1 is a perspective view of a liquid crystal display device using an active matrix substrate according to Embodiment 1 of the present invention.

Hereinafter, preferred embodiments of an active matrix substrate and a display device of the present invention will be described with reference to the drawings. In the following description, the present invention is applied to a transmission-type liquid crystal display device. The size and size ratio of each of the constituent members in the drawings do not exactly reflect those of the actual constituent members.

Embodiment 1

(Configuration Example of Liquid Crystal Display Device)

FIG. 1 is a perspective view of a liquid crystal display device using an active matrix substrate according to Embodiment 1 of the present invention. In FIG. 1, a liquid crystal display device 1 of this embodiment includes an active matrix substrate (TFT substrate) 2 of the present invention and a counter substrate (color filter substrate) 3. The active matrix substrate 2 and the counter substrate 3 are bonded together with a sealing material (as will be described later) so that they face each other. In the liquid crystal display device 1, the sealing material is provided in the form of a frame, and a liquid crystal material is held inside the sealing material to form a liquid crystal layer 18 (see FIG. 7 or 8 as will be described later).

The liquid crystal display device 1 includes a matrix region H in which a plurality of data lines (source lines) and a plurality of scanning lines (gate lines) are arranged in a matrix, as will be described in detail later. The matrix region H functions as an effective display region of the liquid crystal display device 1.

In the liquid crystal display device 1, lines DH including video signal lines (as will be described later) are connected to drive the data lines, drawn from the matrix region H, and formed on a base material of the active matrix substrate 2. Moreover, a plurality of terminals T are provided on the base material of the active matrix substrate 2. As shown in FIG. 1, a data driver (as will be described later) composed of a driver IC 100 is connected to the terminals T.

Figure 2:
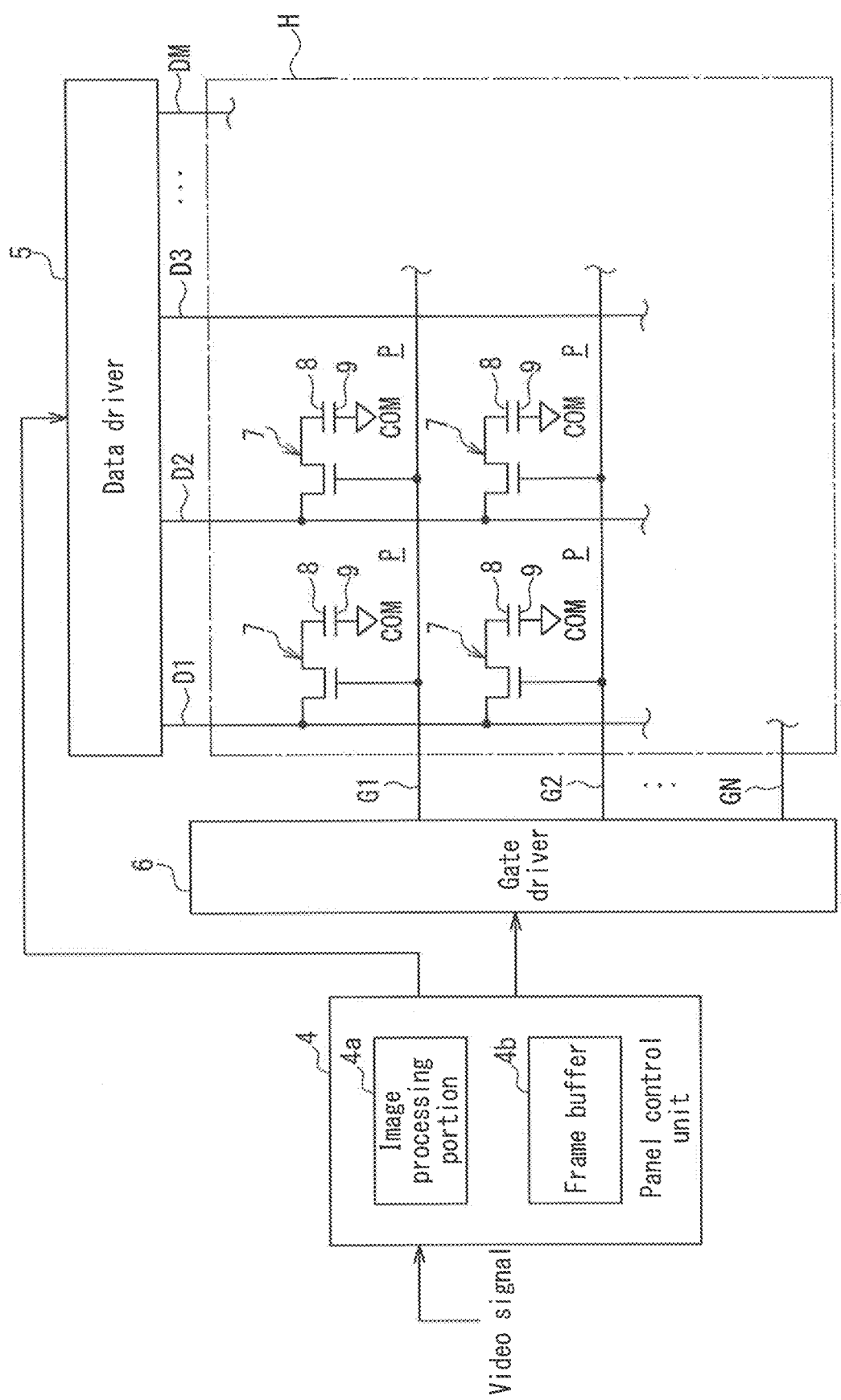
FIG. 2 is a diagram for explaining the main portion of the liquid crystal display device.
Figure 3:
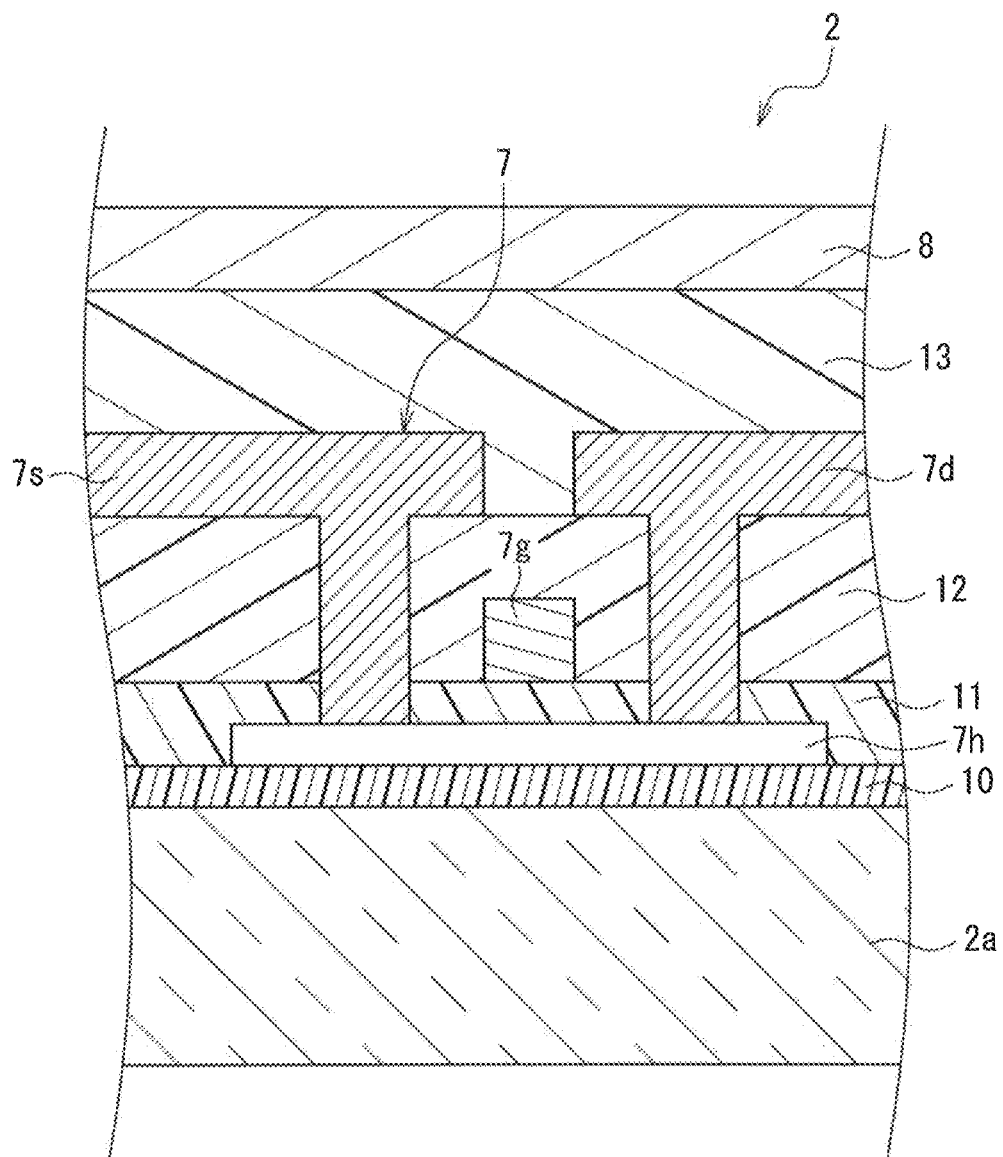
FIG. 3 is an enlarged cross-sectional view of a thin film transistor shown in FIG. 2.

Referring to FIGS. 2 and 3, the main portion of the liquid crystal display device 1 of this embodiment will be specifically described.

FIG. 2 is a diagram for explaining the main portion of the liquid crystal display device. FIG. 3 is an enlarged cross-sectional view of a thin film transistor shown in FIG. 2.

In FIG. 2, the liquid crystal display device 1 includes a panel control unit 4 that performs drive control of a display portion (liquid crystal panel) for displaying information such as characters and images, and a data driver (source driver) 5 and a gate driver 6 that operate based on instruction signals from the panel control unit 4.

The panel control unit 4 receives video signals from the outside of the liquid crystal display device 1. The panel control unit 4 includes an image processing portion 4a and a frame buffer 4b. The image processing portion 4a performs predetermined image processing on the input video signals and generates instruction signals for the data driver 5 and the gate driver 6. The frame buffer 4b can store a frame of display data contained in the input video signals. The panel control unit 4 performs drive control of the data driver 5 and the gate driver 6 in accordance with the input video signals, so that information is displayed on the display portion in accordance with those video signals.

As described above, the data driver 5 is composed of the external driver IC 100. On the other hand, the gate driver 6 is separated into two (left and right) members, which are monolithically formed on the base material of the active matrix substrate 2 using, e.g., polycrystalline silicon as a base.

The data driver 5 and the gate driver 6 are drive circuits for driving a plurality of pixels P of the liquid crystal panel on a pixel-by-pixel basis, and function as a column control circuit and a row control circuit, respectively. A plurality of data lines (column control lines) D1 to DM (M is an integer of 2 or more, and the data lines are generically called "D" in the following) are connected to the data driver 5. A plurality of gate lines (row control lines) G1 to GN (N is an integer of 2 or more, and the gate lines are generically called "G" in the following) are connected to the gate driver 6. The data lines D and the gate lines G are arranged in a matrix so as to intersect with each other on the base material, which is a transparent glass material or a transparent synthetic resin, included in the active matrix substrate 2. Specifically the data lines D are provided on the base material and extend parallel to the column direction of the matrix (i.e., the longitudinal direction of the liquid crystal panel). The gate lines G are provided on the base material and extend parallel to the row direction of the matrix (i.e., the lateral direction of the liquid crystal panel).

Thin film transistors 7 serving as switching elements and the pixels P including pixel electrodes 8 connected to the thin film transistors 7 are provided in the vicinity of each of the intersections of the data lines D and the gate lines G. The pixels P also include counter electrodes 9 that are located opposite the pixel electrodes 8 with the liquid crystal layer interposed between them. In the active matrix substrate 2, the thin film transistors 7 and the pixel electrodes 8 are provided on a pixel-by-pixel basis. Moreover, the pixels P are arranged in a matrix in the matrix region H, thereby forming a pixel array.

The thin film transistor 7 may be, e.g., a top gate electrode type. Specifically as shown in FIG. 3, the thin film transistor 7 includes a semiconductor layer 7h formed on an underlying film 10, a gate electrode 7g provided above the semiconductor layer 7h, and a source electrode 7s and a drain electrode 7d that are connected to the semiconductor layer 7h. The underlying layer 10 is formed to cover the surface of the base material 2a of the active matrix substrate 2.

In the active matrix substrate 2, a gate insulating film 11 is formed to cover the semiconductor layer 7h and the underlying film 10, and the gate electrode 7g that is integrally formed with the gate line G is provided on the gate insulating film 11. Moreover, an interlayer film 12 is formed to cover the gate electrode 7g and the gate insulating film 11, and the source electrode 7s and the drain electrode 7d are provided on the interlayer film 12. Further, a protective film 13 is formed to cover the source electrode 7s, the drain electrode 7d, and the interlayer film 12, and the pixel electrode 8 is provided on the protective film 13.

The gate electrode 7g and the gate line G are made of a first conductive layer (lower-layer metal film), as will be described later. The source electrode 7s is integrally formed with the data line D. The drain electrode 7d is connected to the pixel electrode 8 via a contact hole (not shown). The source electrode 7s, the data line D, and the drain electrode 7d are made of a second conductive layer (upper-layer metal film), as will be described later.

Referring back to FIG. 2, in the active matrix substrate 2, the pixels P are formed in the areas that are arranged in a matrix and separated from one another by the data lines D and the gate lines G. The pixels P include red (R), green (G), and blue (B) pixels. The RGB pixels are sequentially arranged, e.g., in this order in the direction parallel to the gate lines G1 to GN. The RGB pixels are capable of displaying the corresponding colors due to a color filter layer provided on the counter substrate 3.

In the active matrix substrate 2, based on the instruction signal from the image processing portion 4a, the gate driver 6 outputs scanning signals (gate signals) in sequence to the gate lines G1 to GN so that the gate electrodes 7g of the corresponding thin film transistors 7 are turned ON. Moreover, based on the instruction signal from the image processing portion 4a, the data driver 5 outputs data signals (voltage signals (gradation voltages)) in accordance with the brightness (gradation) of the display image to the corresponding data lines D1 to DM.

(Main Configuration of Active Matrix Substrate)

Figure 4:
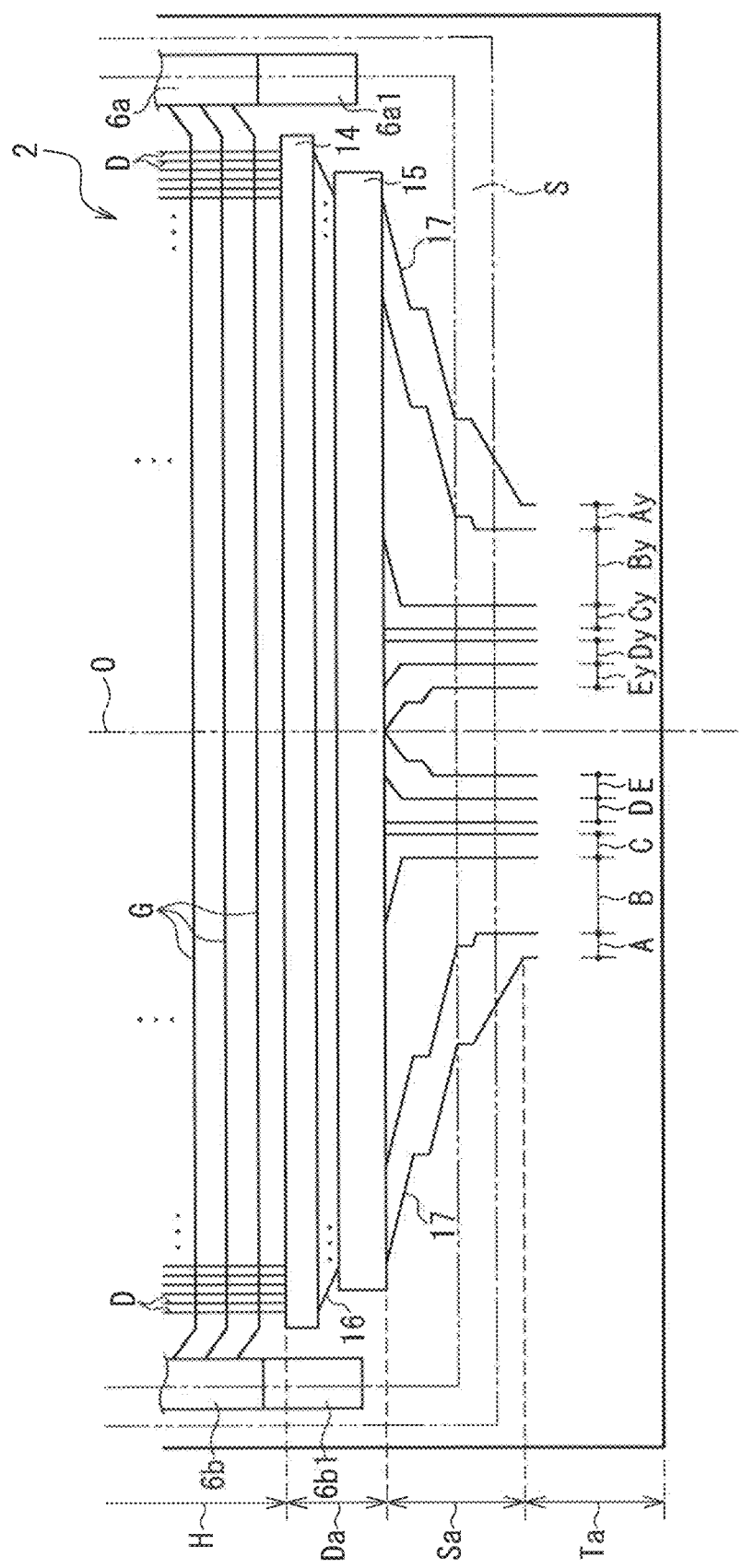
FIG. 4 is a diagram for explaining the main configuration of the active matrix substrate shown in FIG. 1.

Next, referring to FIG. 4, the main configuration of the active matrix substrate 2 of this embodiment will be specifically described.

FIG. 4 is a diagram for explaining the main configuration of the active matrix substrate shown in FIG. 1.

As shown in FIG. 4, the matrix region (effective display region) H, a column control circuit region Da, a video signal line region Sa, and a terminal region Ta are sequentially arranged in the end portion of the active matrix substrate 2, where the driver IC 100 (see FIG. 1) is to be placed.

In the matrix region H, as described above, the gate lines (row control lines) G run horizontally through the pixel array, which is formed inside the matrix region H, and the data lines (column control lines) D run vertically through the pixel array. As shown in FIG. 2, the pixels P including the thin film transistors 7 are arranged in a matrix in the pixel array, and a predetermined voltage is applied to each of the pixels P with the thin film transistors 7.

As shown in FIG. 4, two separate gate drivers (row control circuits) 6a, 6b are monolithically formed on the active matrix substrate 2 in the areas immediately below the sealing material S on both sides of the matrix region H, i.e., in the left and right frame portions of the liquid crystal display device 1. Additional circuits 6a1, 6b1 such as a buffer circuit or a protection circuit are provided adjacent to the gate drivers 6a, 6b, respectively.

The column control circuit region Da includes an RGB switching circuit 14, to which the data lines D are connected, and an inspection and protection circuit 15 connected to the RGB switching circuit 14 via connection lines 16. The inspection and protection circuit 15 is connected to the data driver 5 (see FIG. 2) via video signal lines (signal lines) 17. In addition to the data driver 5, the RGB switching circuit 14 and the inspection and protection circuit 15 also constitute the column control circuit.

The RGB switching circuit 14 serves to divide a signal from one video signal line 17 into a set of RGB (three) data lines D. This configuration can reduce the number of the video signal lines 17. Typically the pixels arranged in 3×n columns can be driven with n video signal lines. In recent years, such an RGB switching circuit 14 has preferably been used because it can be obtained by a relatively simple circuit configuration.

In the inspection and protection circuit 15, an inspection circuit and a protection circuit are integrally formed. The inspection circuit inspects the liquid crystal panel for quality by simply illuminating the liquid crystal panel using a simple input signal, while the driver IC 100 is not mounted.

The protection circuit suppresses the destruction of the column control circuit or the pixels P due to static electricity. The protection circuit is composed of, e.g., a protection transistor, a capacitor, a resistive material, and a diode.

The width of the inspection circuit or the protection circuit is not necessarily the same as that of the region of the pixel array. For example, the size of the inspection circuit or the protection circuit in the horizontal direction of the sheet of FIG. 4 may be slightly smaller than that of the RGB switching circuit 14. In this case, as shown in FIG. 4, the RGB switching circuit 14 is connected to the inspection circuit or the protection circuit via the connection lines 16 that are routed diagonally. Thus, spaces can be created between the inspection circuit or the protection circuit and each of the gate drivers 6a, 6b, and lines needed to drive the RGB switching circuit 14 can pass through by utilizing the spaces. This results in the advantage of reducing the left and right frame portions of the liquid crystal display device 1.

In the active matrix substrate 2 of this embodiment, the RGB switching circuit 14 and the inspection and protection circuit 15 are located in the column control circuit region Da. However, the active matrix substrate 2 of this embodiment is not limited thereto. For example, the column control circuit region Da including the RGB switching circuit 14 and the inspection and protection circuit 15 may be omitted by connecting the video signal lines 17 directly to the data lines D in the matrix region H. Alternatively at least one of the RGB switching circuit 14, the inspection circuit, and the protection circuit may be located in the column control circuit region Da. In either case, the video signal lines 17 are routed to converge in a fan shape toward the terminals T (see FIG. 1) provided in the terminal region Ta.

Defining the center (indicated by "the Y axis 0" in FIG. 4) of the matrix region H as a boundary, the video signal line region Sa on the left side of the boundary in FIG. 4 includes a first line group A, a second line group B, a third line group C, a fourth line group D, and a fifth line group E that are arranged in descending order of interconnection length of the video signal lines 17 when seen from above.

The video signal line region Sa on the right side of the boundary in FIG. 4 includes a sixth line group Ey a seventh line group Dy, an eighth line group Cy a ninth line group By and a tenth line group Ay that are arranged in ascending order of interconnection length of the video signal lines 17 when seen from above. In other words, the video signal lines 17 are laid so as to belong to any of the first to tenth line groups in the video signal line region Sa.

The first line group A and the tenth line group Ay mean that they are positioned symmetrically with respect to the Y axis 0 in FIG. 4. Similarly the second and ninth line groups B and By the third and eighth line groups C and Cy, the fourth and seventh line groups D and Dy and the fifth and sixth line groups E and Ey are each positioned symmetrically with respect to the Y axis 0 in FIG. 4.

(Basic Configuration of Video Signal Line)

Figure 5:
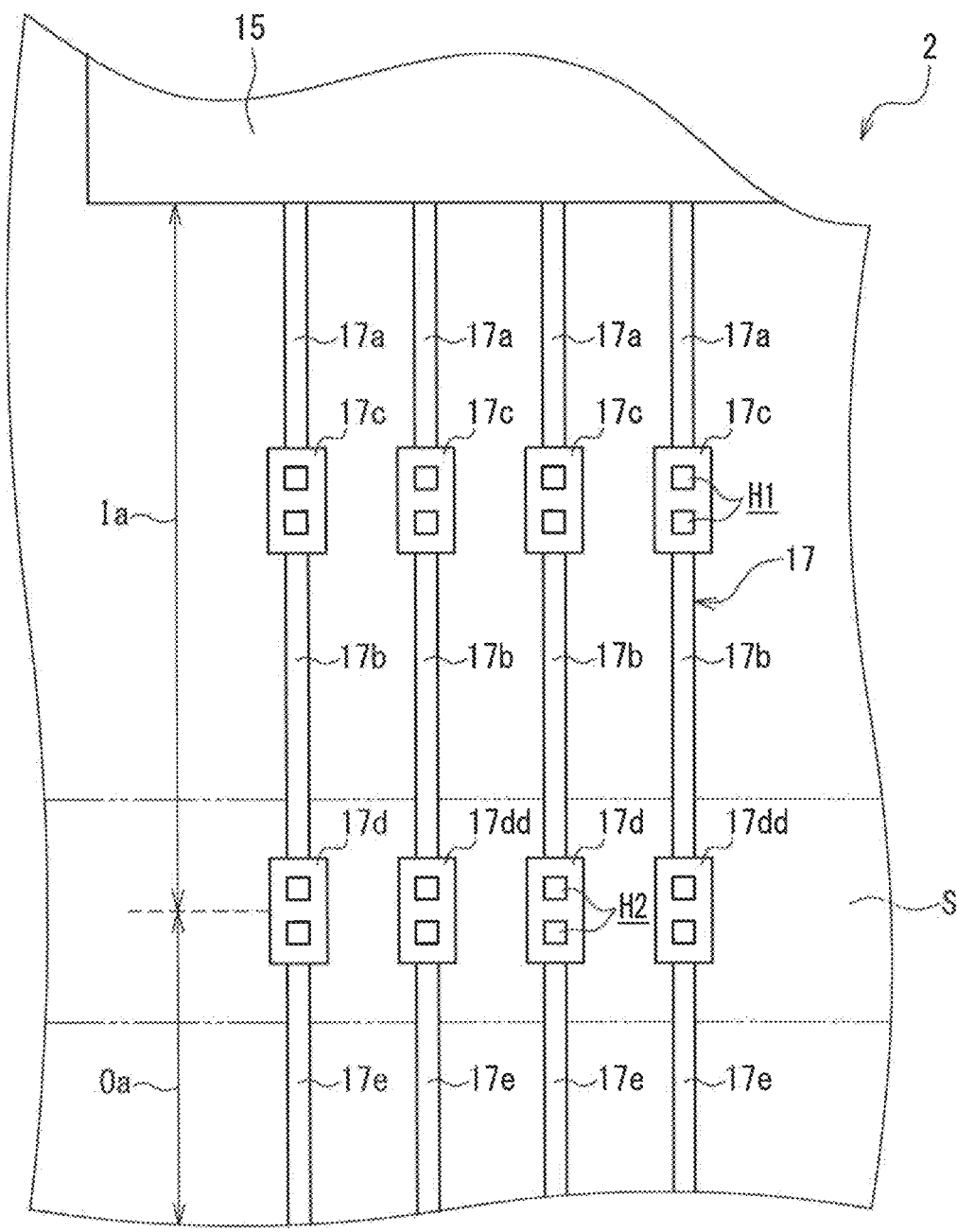
FIG. 5 is a diagram for explaining the configuration of video signal lines shown in FIG. 4.

Next, referring to FIG. 5, the basic configuration of the video signal lines 17 will be specifically described.

FIG. 5 is a diagram for explaining the configuration of the video signal lines shown in FIG. 4.

As shown in FIG. 5, in the active matrix substrate 2 of this embodiment, the video signal line region Sa is divided into two parts when the sealing material S is defined as a boundary: an inner line region Ia facing the column control circuit region Da and an outer line region Oa facing the terminal region Ta. The inner line region Ia includes first line portions 17a connected to the inspection and protection circuit 15 and second line portions 17b connected to the first line portions 17a through contact holes H1 of inner connection portions (connection portions) 17c. Moreover, outer connection portions 17d or dummy outer connection portions 17dd are provided in the boundary portion between the inner line region Ia and the outer line region Oa. The outer line region Oa includes outer lines 17e connected to the second line portions 17b through contact holes H2 of the outer connection portions 17d. The second line portions 17b extend from the dummy outer connection portions 17*dd* as the outer lines 17*e* (as will be described in detail later).

Since the inner line region Ia is located inside the sealing material S, it is easy to prevent corrosion or damage to the lines (i.e., the first and second line portions 17*a* and 17*b*). Therefore, any metal film can be used for the material of the lines in the inner line region Ia, e.g., regardless of how easily it corrodes. For example, a line made of either the lower-layer metal film or the upper-layer metal film (i.e., the first conductive layer or the second conductive layer), which are different from each other, can be the first and second line portions 17*a* and 17*b*. As described in FIG. 3, the first and second conductive layers are not in direct contact with each other because of the presence of the interlayer film 12. Thus, the first and second line portions 17*a* and 17*b* can be arranged at narrow intervals.

Since the outer line region Oa is located outside the sealing material S, a break is likely to occur due to corrosion or damage. Therefore, in the active matrix substrate 2 of this embodiment, the first conductive layer (lower-layer metal film) covered with the interlayer film 12 is used for the outer lines 17*e* in the outer line region Oa.

In the active matrix substrate 2 of this embodiment, the lines are arranged so that the material of the first line portions 17*a* and the material of the second line portions 17*b* in the inner line region Ia are repeatedly replaced with each other in the line direction (i.e., the vertical direction of the sheet of FIG. 5) and in the arrangement direction (i.e., the horizontal direction of the sheet of FIG. 5), as will be described in detail later.

When the inner connection portion 17*c* is located in the position that divides the interconnection length of a video signal line 17 in the inner line region Ia into two equal parts, the interconnection resistance of the adjacent first and second line portions 17*a* and 17*b* can be the same, even if the first conductive layer and the second conductive layer differ in sheet resistance. Moreover, even if the video signal lines 17 are arranged so that the interconnection length becomes gradually longer (or shorter), it is possible to avoid a significant change in resistance of the adjacent first and second line portions 17*a* and 17*b* in the inner line region Ia.

On the other hand, in the active matrix substrate 2 of this embodiment, as shown in FIG. 4, the video signal lines 17 are not merely a set of parallel lines, but exhibit a fan-like appearance. Therefore, it is expected that the arrangement of the inner connection portions 17*c* will be complicated in order to change the path or material of the video signal lines 17. However, such a configuration has never been disclosed. The present invention discloses the configuration, which will be described in detail below.

(Detailed Configuration of Video Signal Line)

Figure 6:
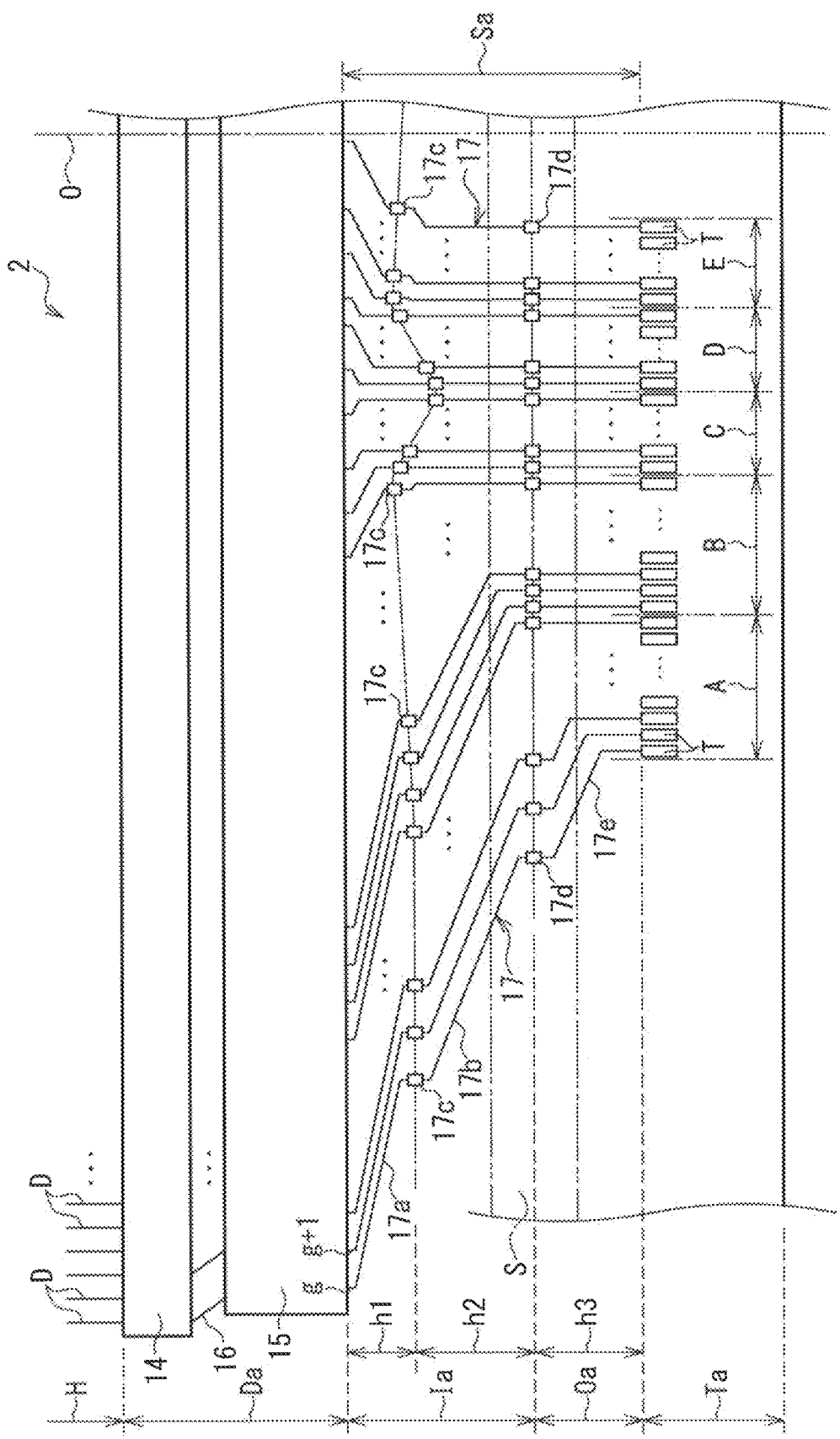
FIG. 6 is an enlarged plan view specifically showing the main configuration of the active matrix substrate.

Next, referring also to FIG. 6, the detailed configuration of the video signal lines 17 will be specifically described. The following description mainly refers to the video signal lines 17 that belong to the first to fifth line groups A to E.

FIG. 6 is an enlarged plan view specifically showing the main configuration of the active matrix substrate.

As shown in FIG. 6, the video signal line region Sa includes two line sections: the inner line region (line region) Ia located closer to the matrix region H and the outer line region Oa located closer to the terminal region Ta. The inner line region Ia includes the first line portions 17*a*, the inner connection portions 17*c*, and the second line portions 17*b*. The outer line region Oa includes the outer lines 17*e*. The second line portions 17*b* are electrically connected to the outer lines 17*e* via the outer connection portions 17*d*.

In the inner line region Ia, there are a first line portion region h1 where the first line portions 17*a* are provided, and a second line portion region h2 where the second line portions 17*b* are provided. The first and second line portion regions h1 and h2 may have different sizes in accordance with the first to fifth line groups A to E. In the outer line region Oa, there is a third line portion region h3 where the outer lines 17*e* are provided. The third line portion region h3 has the same size in all the first to fifth line groups A to E. The size of the third line portion region h3 is also the same as that of the outer line region Oa.

Hereinafter, the g-th video signal line 17 and the adjacent (g+1)-th video signal line 17 will be further described.

The g-th video signal line 17 includes the first line portion 17*a* made of the first conductive layer (lower-layer metal film) and the second line portion 17*b* made of the second conductive layer (upper-layer metal film) in the inner line region Ia. The electrical connection between the first line portion 17*a* and the second line portion 17*b* is maintained by the inner connection portion 17*c*, in which the line material is changed.

The (g+1)-th video signal line 17 includes the first line portion 17*a* made of the second conductive layer and the second line portion 17*b* made of the first conductive layer in the inner line region Ia. The electrical connection between the first line portion 17*a* and the second line portion 17*b* is maintained by the inner connection portion 17*c*, in which the line material is changed.

In the active matrix substrate 2 of this embodiment, the video signal line 17 having the structure as indicated by the g-th video signal line 17 and the video signal line 17 having the structure as indicated by the (g+1)-th video signal line 17 are alternately arranged to form the first to tenth line groups A to Ay.

(Cross-Sectional Configuration of g-Th Video Signal Line 17)

Figure 7:
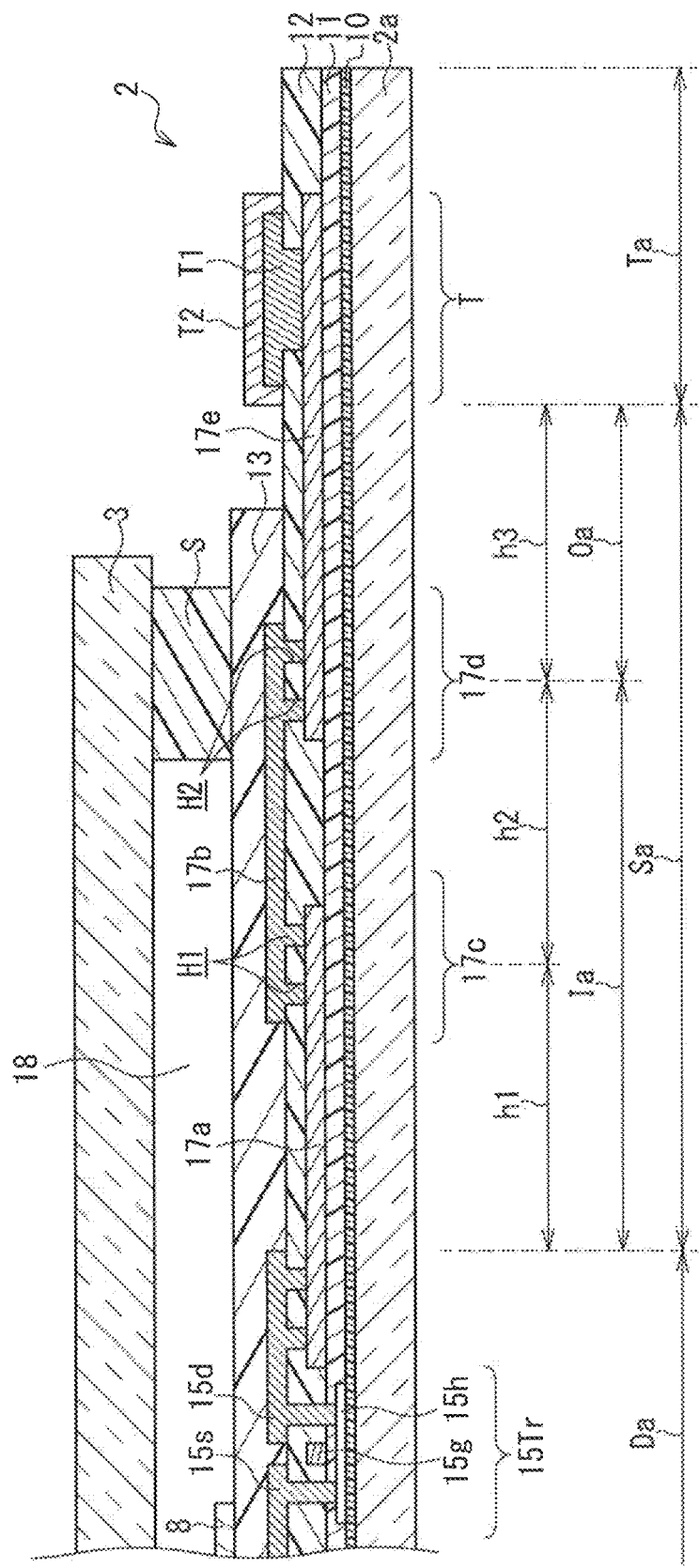
FIG. 7 is a cross-sectional view showing one of two adjacent video signal lines.

Next, referring to FIG. 7, the cross-sectional configuration of the g-th video signal line 17 will be specifically described.

FIG. 7 is a cross-sectional view showing one of two adjacent video signal lines.

As shown in FIG. 7, the liquid crystal display device 1 of this embodiment includes the thin film transistors 7 (see FIG. 3) and 15Tr using polycrystalline silicon as a base material. The circuit layers are formed on the active matrix substrate 2 in the following order from the bottom: the underlying film 10, a semiconductor layer 15*h*, the gate insulating film 11, a gate electrode 15*g*, the interlayer film 12, a source electrode 15*s* and a drain electrode 15*d*, the protective film 13, and the pixel electrode 8. In FIG. 7, the thin film transistor 15Tr is contained in the protection circuit of the inspection and protection circuit 15.

As in the case of the gate electrode 7*g* and the gate line G, the gate electrode 15*g* is made of the first conductive layer (lower-layer metal film). The first conductive layer is a refractory metal thin film such as tungsten or tantalum. This metal film has large sheet resistance, but can easily maintain the reliability because it is positioned in the lower layer.

As in the case of the source electrode 7*s*, the drain electrode 7*d*, and the data line D, the source electrode 15*s* and the drain electrode 15*d* are made of the second conductive layer (upper-layer metal film). The second conductive layer is a metal thin film having low sheet resistance such as aluminum or chromium. This metal film is likely to suffer corrosion. However, if the second conductive layer is used under the conditions that the second conductive layer is covered with the protective film 13, or the second conductive layer is limited to the inner line region Ia including the area immediately below the sealing material S, the second conductive layer will be isolated and protected from the outside air, so that corrosion or a break can be suppressed. Thus, the second conductive layer is sufficiently practical for the lines.

The g-th video signal line 17 has a path that passes through the first line portion 17a located closer to the matrix region H, the inner connection portion 17c, the second line portion 17b, the outer connection portion 17d, the outer line 17e, and the terminal T.

The first line portion 17a starts immediately after the drain electrode 15d through the contact hole, and reaches the inner connection portion 17c. The first line portion 17a is made of the first conductive layer.

The inner connection portion 17c is made of the first conductive layer, the interlayer film 12, and the second conductive layer. The first conductive layer is electrically connected to the second conductive layer by the contact hole H1 provided in the interlayer film 12.

The second line portion 17b starts from the inner connection portion 17c, and reaches the outer connection portion 17d. The second line portion 17b is made of the second conductive layer.

The outer connection portion 17d is made of the first conductive layer, the interlayer film 12, and the second conductive layer. The first conductive layer is electrically connected to the second conductive layer by the contract hole H2 provided in the interlayer film 12.

The outer line 17e is made of the first conductive layer. The outer line 17e starts from the outer connection portion 17d, and reaches the terminal T.

The terminal T has a structure in which the first conductive layer, the interlayer film 12 having an opening, and an electrode portion T1 made of the second conductive layer are laminated in this order, and a transparent electrode T2 is formed on the surface of the laminate to make an electrical connection with the driver IC 100. The material of the transparent electrode T2 may be the same as the transparent electrode material of the pixel electrode 8.

Figure 8:
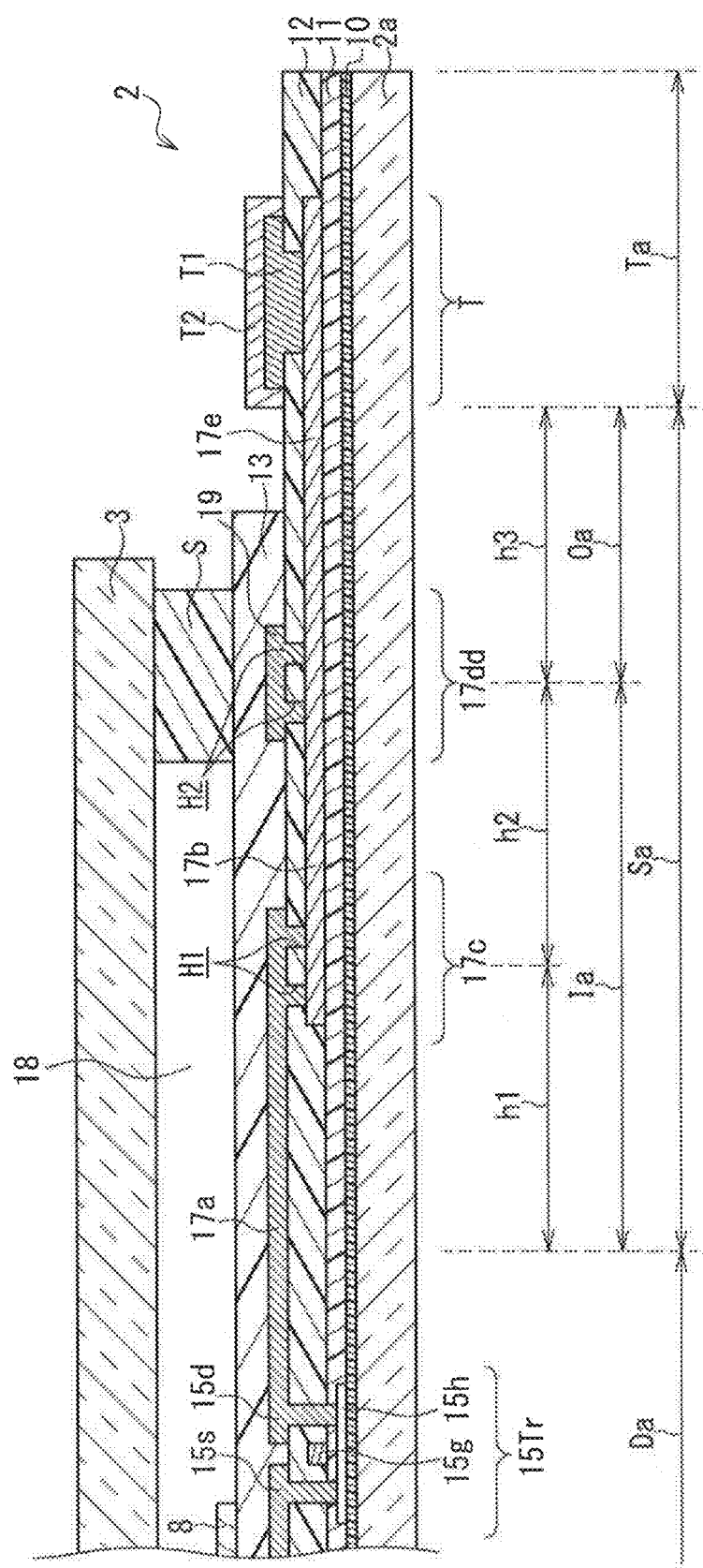
FIG. 8 is a cross-sectional view showing the other of the two adjacent video signal lines.

(Cross-sectional configuration of (g+1)-th video signal line 17) Next, referring to FIG. 8, the cross-sectional configuration of the (g+1)-th video signal line 17 will be specifically described.

FIG. 8 is a cross-sectional view showing the other of the two adjacent video signal lines.

As shown in FIG. 8, the (g+1)-th video signal line 17 has a path that passes through the first line portion 17a located closer to the matrix region H, the inner connection portion 17c, the second line portion 17b, the dummy outer connection portion 17dd, the outer line 17e, and the terminal T.

The first line portion 17a extends from the drain electrode 15d directly to the inner connection portion 17c. The first line portion 17a is made of the second conductive layer (upper-layer metal film).

The inner connection portion 17c is made of the first conductive layer, the interlayer film 12, and the second conductive layer. The first conductive layer is electrically connected to the second conductive layer by the contact hole H1 provided in the interlayer film 12.

The second line portion 17b starts from the inner connection portion 17c, and reaches the outer connection portion 17dd. The second line portion 17b is made of the first conductive layer.

The outer connection portion 17dd is made of the first conductive layer, the interlayer film 12, and the second conductive layer. The first conductive layer is electrically connected to the second conductive layer by the contact hole H2 provided in the interlayer film 12. In the (g+1)-th video signal line 17, since the second line portion 17b and the outer line 17e are made of the same first conductive layer, the outer connection portion 17dd is a sort of dummy connection portion.

The dummy outer connection portion 17dd may be used as a reference position for plotting the routing of lines in a mask layout, or may not be used if a person skilled in the art considers it unnecessary. In view of the fact that the dummy outer connection portion 17dd is located immediately below the sealing material S, the dummy outer connection portion 17dd may be provided in order to make the cell gap uniform in the vicinity of the terminal region Ta of the liquid crystal display device 1.

When the present specification refers to an arrangement interval of the outer connection portions, it does not make a distinction between the normal outer connection portion 17d and the dummy outer connection portion 17dd or the virtual outer connection portion.

The outer line 17e is made of the first conductive layer. The outer line 17e starts from the outer connection portion 17dd, and reaches the terminal T.

The terminal T has a structure in which the first conductive layer, the interlayer film 12 having an opening, and an electrode portion T1 made of the second conductive layer are laminated in this order, and a transparent electrode T2 is formed on the surface of the laminate to make an electrical connection with the driver IC 100. The material of the transparent electrode T2 may be the same as the transparent electrode material of the pixel electrode 8.

(G-Th and (g+1)-Th Video Signal Lines 17)

As described above, since the g-th video signal line 17 is adjacent to the (g+1)-th video signal line 17, their interconnection lengths from the inspection and protection circuit 15 to the terminals T can be considered substantially the same.

Therefore, if the ratio of the section formed of the first conductive layer to the section formed of the second conductive layer is the same between the g-th video signal line 17 and the (g+1)-th video signal line 17, the interconnection resistance of the g-th video signal line 17 can be considered substantially the same as that of the (g+1)-th video signal line 17. This can avoid a significant change in the interconnection resistance of at least the adjacent video signal lines 17, and thus can maintain the uniformity in display without any display unevenness in the liquid crystal display device 1.

In the active matrix substrate 2 of this embodiment, the inner connection portion 17c is located in the position that divides the interconnection length in the inner line region Ia into two equal parts (i.e., the position that makes the length of the first line portion 17a equal to that of the second line portion 17b). Therefore, the ratio of the section formed of the first conductive layer to the section formed of the second conductive layer can be the same between the g-th video signal line 17 and the (g+1)-th video signal line 17.

In the video signal lines 17, the metal films of two adjacent video signal lines 17 in the inner line region Ia are present separately via the interlayer film. Therefore, the video signal lines 17 can be arranged at a narrow pitch while reducing the possibility of a short circuit due to foreign matters. Thus, the video signal lines 17 can be routed to form a fan shape that tapers at sharp angle. Consequently the liquid crystal display device 1 can have a small frame on the terminal side (i.e., the side of the liquid crystal display device 1 in which the terminals T are provided).

(Configuration of Video Signal Lines Converging in a Fan Shape)

The above description has focused on two adjacent video signal lines. However, it requires more ingenuity to apply this configuration to many video signal lines 17 that are routed to converge in a fan shape, i.e., to a plurality of video signal lines 17 that are laid in the line region (inner line region Ia) between the matrix region H and the terminal region Ta so that the line pitch becomes narrower in the direction from the matrix region H to the terminal region Ta.

In order to efficiently route the lines at a narrow pitch with the use of the first conductive layer and the second conductive layer, the present inventors found out that the configuration of many video signal lines 17 should not be uniform, but needs to be intentionally changed.

Then, the present inventors have completed the present invention by dividing the video signal lines 17 into groups such as the first to fifth line groups A to E and the sixth to tenth line groups Ey to Ay as shown in FIG. 4, and by allowing each of the groups to have a suitable configuration. This will be described in the following. FIG. 4 shows a total of ten line groups, i.e., the first to fifth line groups A to E and the sixth to tenth line groups Ey to Ay. However, the present invention is not limited thereto, and may include at least three line groups, i.e., the first to third line groups A to C in the case where the types of line groups are minimized, as will be described later.

(Video Signal Lines 17 of First Line Group A)

Figure 9:
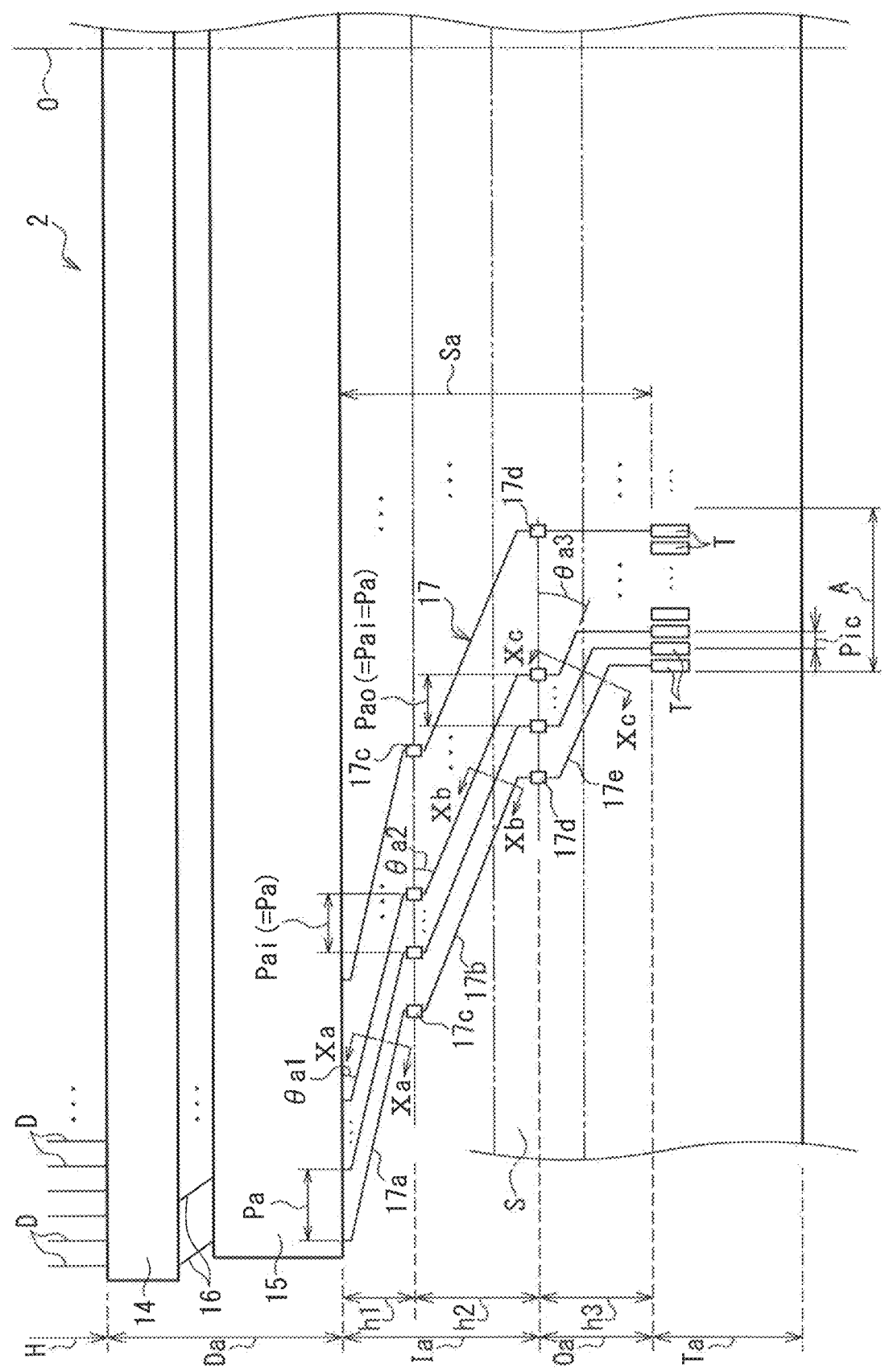
FIG. 9 is a diagram for explaining video signal lines of a first line group shown in FIG. 6.

Next, referring to FIGS. 9 to 10, the video signal lines 17 of the first line group A will be specifically described.

Figure 10A:
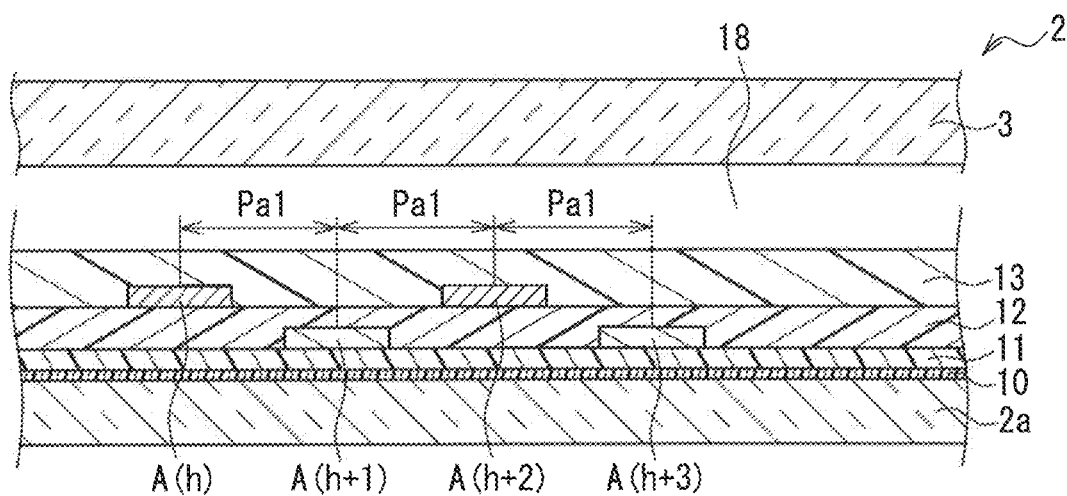
FIG. 10(*a*) is a cross-sectional view taken along the line Xa-Xa in FIG. 9.
Figure 10B:
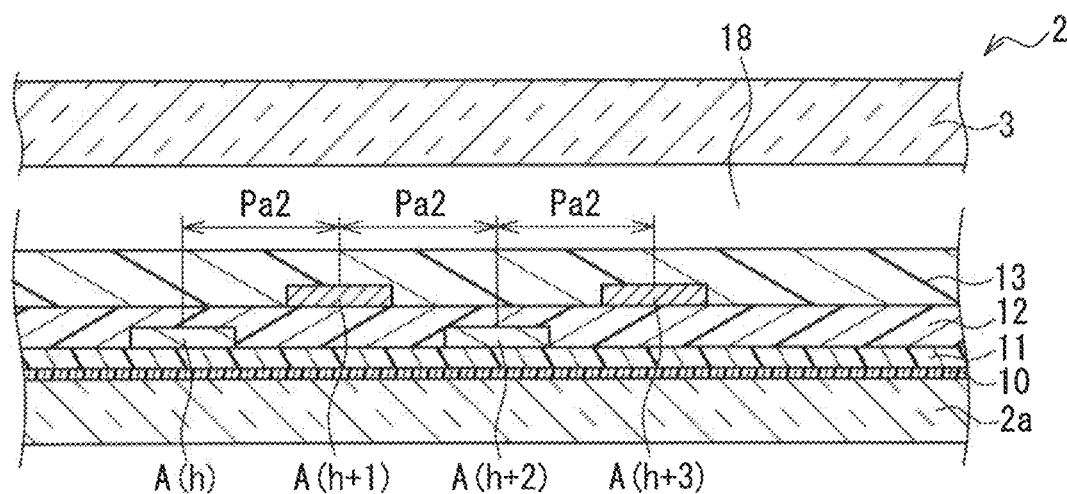
Figure 10C:
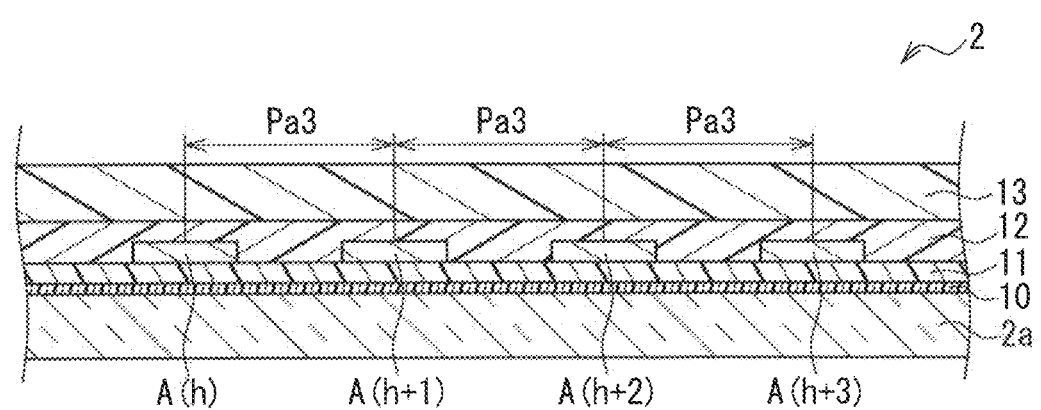

FIG. 9 is a diagram for explaining the video signal lines of the first line group shown in FIG. 6. FIG. 10(a) is a cross-sectional view taken along the line Xa-Xa in FIG. 9. FIG. 10(b) is a cross-sectional view taken along the line Xb-Xb in FIG. 9. FIG. 10(c) is a cross-sectional view taken along the line Xc-Xc in FIG. 9. In FIG. 9, for simplification, the video signal lines 17 other than the video signal lines 17 of the first line group A are omitted.

As shown in FIG. 9, the video signal lines 17 of the first line group A are laid in the direction from the upper left to the lower right of the sheet of the drawing. The video signal line region Sa includes the inner line region Ia located closer to the matrix region H and the outer line region Oa located closer to the terminal region Ta when the sealing material S is defined as a boundary between the two regions. The inner line region Ia includes the first line portions 17a, the inner connection portions 17c, and the second line portions 17b in this order from the matrix region H side. The second line portions 17b in the inner line region Ia are electrically connected to the outer lines 17e in the outer line region Oa by the outer connection portions 17d. Therefore, each of the video signal lines 17 of the first line group A has a path that passes through the first line portion 17a, the inner connection portion 17c, the second line portion 17b, the outer connection portion 17d, the outer line 17e, and the terminal T when seen from the matrix region H side.

The first line portions 17a are drawn parallel to each other at a predetermined pitch (arrangement interval) Pa along one side of the matrix region H (i.e., the horizontal direction of the sheet of FIG. 9) in the direction from the inspection and protection circuit 15 to the terminal region Ta. Moreover, the first line portions 17a are drawn at a predetermined angle θa1 with respect to one side of the matrix region H.

As shown in FIG. 10(a), the first line portions 17a have the structure in which the second conductive layer and the first conductive layer are alternately repeated at a pitch Pa1. Specifically the A(h)-th first line portion 17a and the A(h+2)-th first line portion 17a are made of the second conductive layer, and the A(h+1)-th first line portion 17a and the A(h+3)-th first line portion 17a are made of the first conductive layer.

The pitch of the adjacent A(h)-th and A(h+1)-th first line portions 17a is Pa1. The pitch of the first line portions 17a present in the same layer, e.g., the pitch between the A(h)-th first line portion 17a and the A(h+2)-th first line portion 17a is 2×Pa1. Similarly the pitch between the A(h+1)-th first line portion 17a and the A(h+3)-th first line portion 17a is 2×Pa1.

The inner connection portions 17c are located in the positions that connect the first line portions 17a and the second line portions 17b, and are arranged parallel to each other at predetermined intervals (Pai) along one side of the matrix region H. Moreover, the inner connection portions 17c are located in the positions that divide the interconnection length of the individual video signal lines 17 in the inner line region Ia into two equal parts in order to make the interconnection resistance of two adjacent video signal lines 17 uniform. Thus, the length of the first line portions 17a is equal to that of the second line portions 17b.

The second line portions 17b are drawn from the inner connection portions 17c toward the terminal region Ta at a predetermined angle θa2 with respect to the arrangement direction of the inner connection portions 17c, i.e., one side of the matrix region H. As shown in FIG. 10(b), the second line portions 17b have the structure in which the second conductive layer and the first conductive layer are alternately repeated at a pitch Pa2. The first line portion 17a and the second line portion 17b that are present in the same path of each of the video signal lines 17 differ in their line materials. Specifically the A(h)-th second line portion 17b and the A(h+2)-th second line portion 17b are made of the first conductive layer, and the A(h+1)-th second line portion 17b and the A(h+3)-th second line portion 17b are made of the second conductive layer.

The pitch of the adjacent A(h)-th and A(h+1)-th second line portions 17b is Pa2. The pitch of the second line portions 17b in the same layer, e.g., the pitch between the A(h)-th second line portion 17b and the A(h+2)-th second line portion 17b is 2×Pa2. Similarly the pitch between the A(h+1)-th second line portion 17b and the A(h+3)-th second line portion 17b is 2×Pa2.

The outer connection portions 17d are located in the positions that connect the second line portions 17b and the outer lines 17e, and are arranged parallel to each other at predetermined intervals (Pao) along one side of the matrix region H. In this case, there are two types of the outer connection portions 17d. When the line materials of the second line portion 17b and the outer line 17e are different, the outer connection portion 17d functions as a line switching portion. When the line materials of the second line portion 17b and the outer line 17e are the same, a dummy outer connection portion 17dd is used. In an extreme case, the dummy outer connection portion 17dd is not required. Unless otherwise noted, the present specification does not make a distinction between the normal outer connection portion 17d and the dummy outer connection portion 17dd. Needless to say, however, whether the outer connection portion in question is normal or dummy can obviously be determined from the configuration of the second line portion 17b and the outer line 17e.

The outer lines 17e are drawn from the outer connection portions 17d toward the terminal region Ta at a predetermined angle θa3 with respect to the arrangement direction of the terminals T, i.e., one side of the matrix region H. As shown in FIG. 10(c), the outer lines 17e have the structure in which the first conductive layer is repeated at a pitch Pa3. Specifically all the A(h)-th, A(h+1)-th, A(h+2)-th, and A(h+3)-th outer lines 17e are made of the first conductive layer. The outer lines 17e are bent in the middle of their paths and extend to the terminals T. Moreover, the pitch of the outer lines 17e is changed so that the outer lines 17e can be connected to the terminals T that are arranged at a predetermined pitch Pic. Thus, in the first line group A, the positioning is made to connect the video signal lines 17 to the terminals T by bending the outer lines 17e.

The following is an explanation of the features and suitable routing of the video signal lines 17 of the first line group A. The first line group A is characterized in that the inner connection portions 17c are arranged parallel to each other along one side of the matrix region H. The reason and effect of this arrangement will be described below.

In the inner line region Ia, when the lines including a set of the first conductive layer and the second conductive layer that differ in sheet resistance are repeatedly laid, it is necessary to avoid a significant change in resistance of two adjacent video signal lines 17. For this purpose, the inner connection portions 17c should be located in the positions that divide the individual video signal lines 17 into two equal parts, and the line material should be changed in each of the inner connection positions 17c.

In view of the fact that the positioning of the video signal lines 17 and the terminals T is made by the curved outer lines 17e, if Pa=Pao is satisfied, where Pa represents the pitch at one end of the video signal lines 17 and Pao represents the pitch at the other end of the video signal lines 17 in the inner line region Ia, the first line portions 17a and the second line portions 17b may be substantially straight parallel lines. Thus, since each of the video signal lines 17 in the inner line region Ia can be considered as a single line, it is easy to find the position that geometrically divides the single line into two equal parts. Therefore, the inner connection portion 17c can be located based on this position. When the layout of the first line portions 17a and the second line portions 17b is adjusted in the above manner, and the conditions are appropriately controlled, the length of the first line portions 17a can be equal to that of the second line portions 17b.

In order to achieve better routing, it is preferable that θa1=θa2 is satisfied, where θa1 is the angle indicating the drawing direction of the first line portions 17a and θa2 is the angle indicating the drawing direction of the second line portions 17b. This allows the first line portion 17a and the second line portion 17b to be identified as a single substantially straight line that is not curved. Thus, it is easy to find the position that divides each of the video signal lines 17 in the inner line region Ia into two equal parts.

The angle θa1 indicating the drawing direction of the first line portions 17a is determined by the line pitch Pa1 and the drawing pitch Pa. The angle θa2 indicating the drawing direction of the second line portions 17b is determined by the line pitch Pa2 and the drawing pitch Pai. Since the cross-sectional structures and the line materials of the first line portions 17a and the second line portions 17b are considered to be the same, the relationship between the line pitch Pa1 of the first line portions 17a and the line pitch Pa2 of the second line portions 17b may be Pa1=Pa2. Accordingly Pa=Pai is most suitable to make the angle θa1 equal to the angle θa2.

(Video Signal Lines 17 of Second Line Group B)

Figure 11:
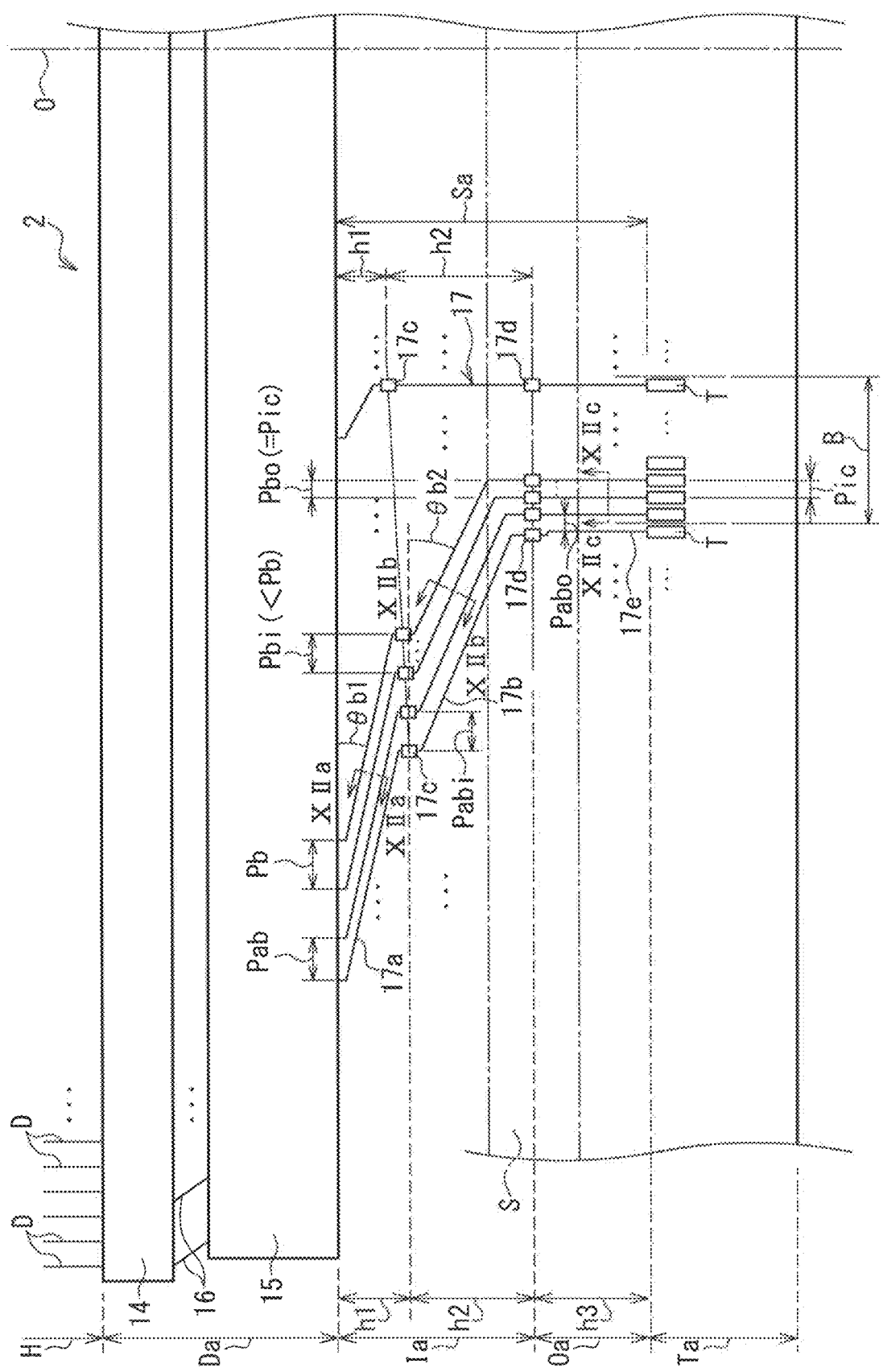
FIG. 11 is a diagram for explaining video signal lines of a second line group shown in FIG. 6.

Next, referring to FIGS. 11 to 12, the video signal lines 17 of the second line group B will be specifically described.

Figure 12A:
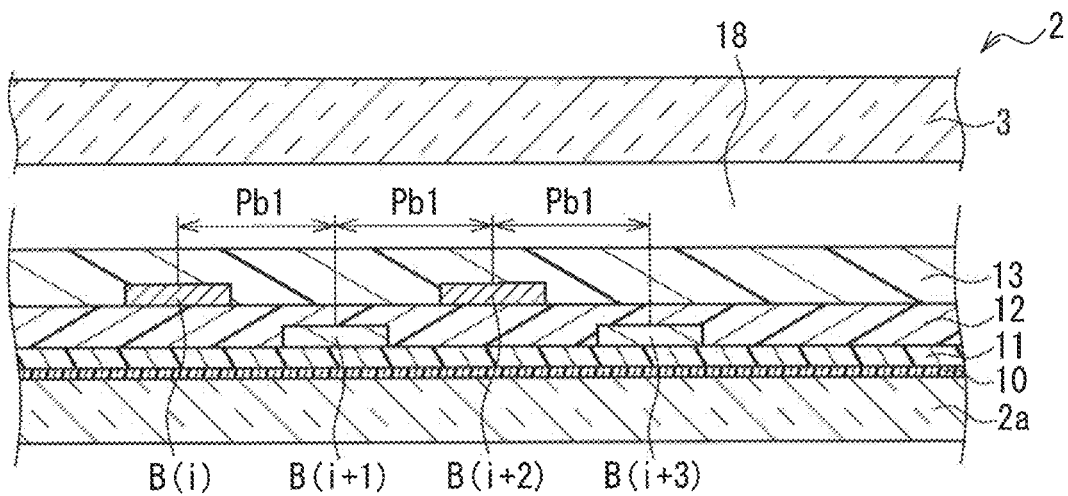
FIG. 12(*a*) is a cross-sectional view taken along the line XIIa-XIIa in FIG. 11.
Figure 12B:
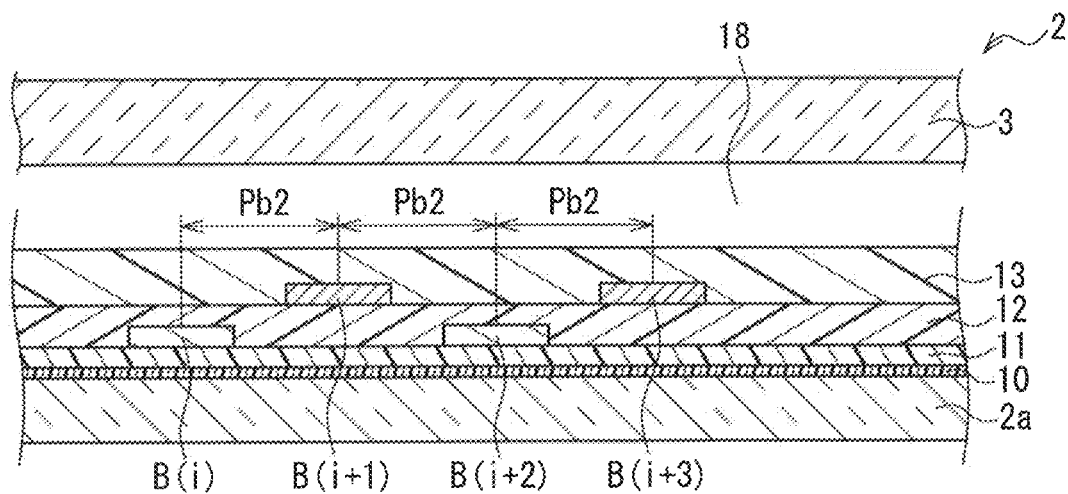
Figure 12C:
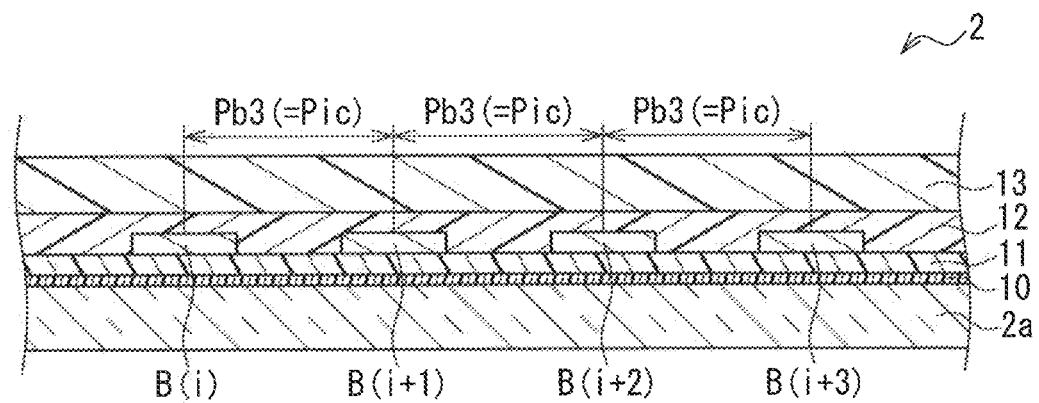

FIG. 11 is a diagram for explaining the video signal lines of the second line group shown in FIG. 6. FIG. 12(a) is a cross-sectional view taken along the line XIIa-XIIa in FIG. 11. FIG. 12(b) is a cross-sectional view taken along the line XIIb-XIIb in FIG. 11. FIG. 12(c) is a cross-sectional view taken along the line XIIc-XIIc in FIG. 11. In FIG. 11, for simplification, the video signal lines 17 other than the video signal lines 17 of the second line group B and one video signal line 17 of the adjacent first line group A are omitted.

As shown in FIG. 11, the video signal lines 17 of the second line group B are laid in the direction from the upper left to the lower right of the sheet of the drawing. The video signal line region Sa includes the inner line region Ia located closer to the matrix region H and the outer line region Oa located closer to the terminal region Ta when the sealing material S is defined as a boundary between the two regions. The inner line region Ia includes the first line portions 17a, the inner connection portions 17c, and the second line portions 17b in this order from the matrix region H side. The second line portions 17b in the inner line region Ia are electrically connected to the outer lines 17e in the outer line region Oa by the outer connection portions 17d. Therefore, each of the video signal lines 17 of the second line group B has a path that passes through the first line portion 17a, the inner connection portion 17c, the second line portion 17b, the outer connection portion 17d, the outer line 17e, and the terminal T when seen from the matrix region H side.

The first line portions 17a are drawn parallel to each other at a predetermined pitch (arrangement interval) Pb along one side of the matrix region H (i.e., the horizontal direction of the sheet of FIG. 11) in the direction from the inspection and protection circuit 15 to the terminal region Ta. Moreover, the first line portions 17a are drawn at a predetermined angle θb1 with respect to one side of the matrix region H.

As shown in FIG. 12(a), the first line portions 17a have the structure in which the second conductive layer and the first conductive layer are alternately repeated at a pitch Pb1. Specifically the B(i)-th first line portion 17a and the B(i+2)-th first line portion 17a are made of the second conductive layer, and the B(i+1)-th first line portion 17a and the B(i+3)-th first line portion 17a are made of the first conductive layer.

The pitch of the adjacent B(i)-th and B(i+1)-th first line portions 17a is Pb1. The pitch of the first line portions 17a present in the same layer, e.g., the pitch between the B(i)-th first line portion 17a and the B(i+2)-th first line portion 17a is 2×Pb1. Similarly the pitch between the B(i+1)-th first line portion 17a and the B(i+3)-th first line portion 17a is 2×Pb1.

The inner connection portions 17c are located in the positions that connect the first line portions 17a and the second line portions 17b, and are arranged so as to gradually get closer to one side of the matrix region H. The pitch of the inner connection portions 17c along one side of the matrix region H is Pbi. Moreover, the inner connection portions 17c are located in the positions that divide the interconnection length of the individual video signal lines 17 in the inner line region Ia into two equal parts in order to make the interconnection resistance of two adjacent video signal lines 17 uniform. Thus, the length of the first line portions 17a is equal to that of the second line portions 17b.

The second line portions 17b are drawn from the inner connection portions 17c toward the terminal region Ta at a predetermined angle θb2 with respect to one side of the matrix region H. As shown in FIG. 12(b), the second line portions 17b have the structure in which the second conductive layer and the first conductive layer are alternately repeated at a pitch Pb2. The first line portion 17a and the second line portion 17b that are present in the same path of each of the video signal lines 17 differ in their line materials.

Specifically the B(i)-th second line portion 17b and the B(i+2)-th second line portion 17b are made of the first conductive layer, and the B(i+1)-th second line portion 17b and the B(i+3)-th second line portion 17b are made of the second conductive layer.

The pitch of the adjacent B(i)-th and B(i+1)-th second line portions 17b is Pb2. The pitch of the second line portions 17b in the same layer, e.g., the pitch between the B(i)-th second line portion 17b and the B(i+2)-th second line portion 17b is 2×Pb2. Similarly the pitch between the B(i+1)-th second line portion 17b and the B(i+3)-th second line portion 17b is 2×Pb2.

The outer connection portions 17d are located in the positions that connect the second line portions 17b and the outer lines 17e, and are arranged parallel to each other at predetermined intervals (Pbo) along one side of the matrix region H. In this case, there are two types of the outer connection portions 17d. When the line materials of the second line portion 17b and the outer line 17e are different, the outer connection portion 17d functions as a line switching portion. When the line materials of the second line portion 17b and the outer line 17e are the same, a dummy outer connection portion 17dd is used. In an extreme case, the dummy outer connection portion 17dd is not required. Unless otherwise noted, the present specification does not make a distinction between the normal outer connection portion 17d and the dummy outer connection portion 17dd. Needless to say, however, whether the outer connection portion in question is normal or dummy can obviously be determined from the configuration of the second line portion 17b and the outer line 17e.

The outer lines 17e are drawn from the outer connection portions 17d toward the terminal region Ta at right angles (at an angle θb3 (not shown)) to the arrangement direction of the terminals T, i.e., one side of the matrix region H without any bending. As shown in FIG. 12(c), the outer lines 17e have the structure in which the first conductive layer is repeated at a pitch Pb3. Specifically all the B(i)-th, B(i+1)-th, B(i+2)-th, and B(i+3)-th outer lines 17e are made of the first conductive layer. The outer lines 17e extend to the terminals T without being bent in the middle of their paths. Therefore, the relationship between the pitch Pb3 of the outer lines 17e and the pitch Pic of the terminals T is Pb3=Pic. Thus, in the second line group B, the positioning is made to connect the video signal lines 17 to the terminals T by bending the second line portions 17b rather than the outer lines 17e.

The following is an explanation of the features and suitable routing of the video signal lines 17 of the second line group B. The second line group B is characterized in that the inner connection portions 17c are arranged so as to gradually get closer to one side of the matrix region H. The reason and effect of this arrangement will be described below.

In the inner line region Ia, when the lines including a set of the first conductive layer and the second conductive layer that differ in sheet resistance are repeatedly laid, it is necessary to avoid a significant change in resistance of two adjacent video signal lines 17. For this purpose, the inner connection portions 17c should be located in the positions that divide the individual video signal lines 17 into two equal parts, and the line material should be changed in each of the inner connection portions 17c.

However, in the second line group B, the positioning of the video signal lines 17 and the terminals T is made by the curved second line portions 17b, and the interconnection distance in the inner line region Ia becomes gradually shorter. Therefore, it requires some ingenuity to arrange the inner connection portions 17c. In other words, a repetitive arrangement of the inner connection portions 17c is not appropriate, and the arrangement should be adjusted positively.

In the active matrix substrate 2 of this embodiment, Pbi<Pb is satisfied, where Pbi represents the pitch of the inner connection portions 17c along one side of the matrix region H and Pb represents the pitch at one end of the video signal lines 17 in the inner line region Ia. Moreover, the inner connection portions 17c are arranged on an oblique line extending in the upper right direction of the sheet of FIG. 11 so that each of the inner connection portions 17c gradually gets closer to one side of the matrix region H in increments of Δb per pitch. In this manner, the inner connection portions 17c can be located in the vicinity of the positions that divide the interconnection length in the inner line region Ia into two equal parts. Thus, when the conditions are appropriately controlled, the length of the first line portions 17a can be equal to that of the second line portions 17b.

In order to achieve better routing, it is preferable that both θa1=θb1 and θa2=θb2 are satisfied, where θb1 is the angle indicating the drawing direction of the first line portions 17a and θb2 is the angle indicating the drawing direction of the second line portions 17b, while θa1 is the angle indicating the drawing direction of the first line portions 17a and θa2 is the angle indicating the drawing direction of the second line portions 17b of the first line group A. This prevents interference of the drawing direction of the video signal lines 17 of the second line group B with the video signal lines 17 of the adjacent first line group A.

In the second line group B, the angle θb1 indicating the drawing direction of the first line portions 17a is determined by the line pitch Pb1 and the drawing pitch Pb. The angle θb2 indicating the drawing direction of the second line portions 17b is determined by the line pitch Pb2, the drawing pitch Pbi, and Δb. Since the cross-sectional structures and the line materials of the first line portions 17a and the second line portions 17b are considered to be the same, the relationship between the line pitch Pb1 of the first line portions 17a and the line pitch Pb2 of the second line portions 17b may be Pb1=Pb2. Accordingly Pb>Pbi is most suitable to make the angle θb1 equal to the angle θb2.

(Video Signal Lines 17 of Third Line Group C)

Figure 13:
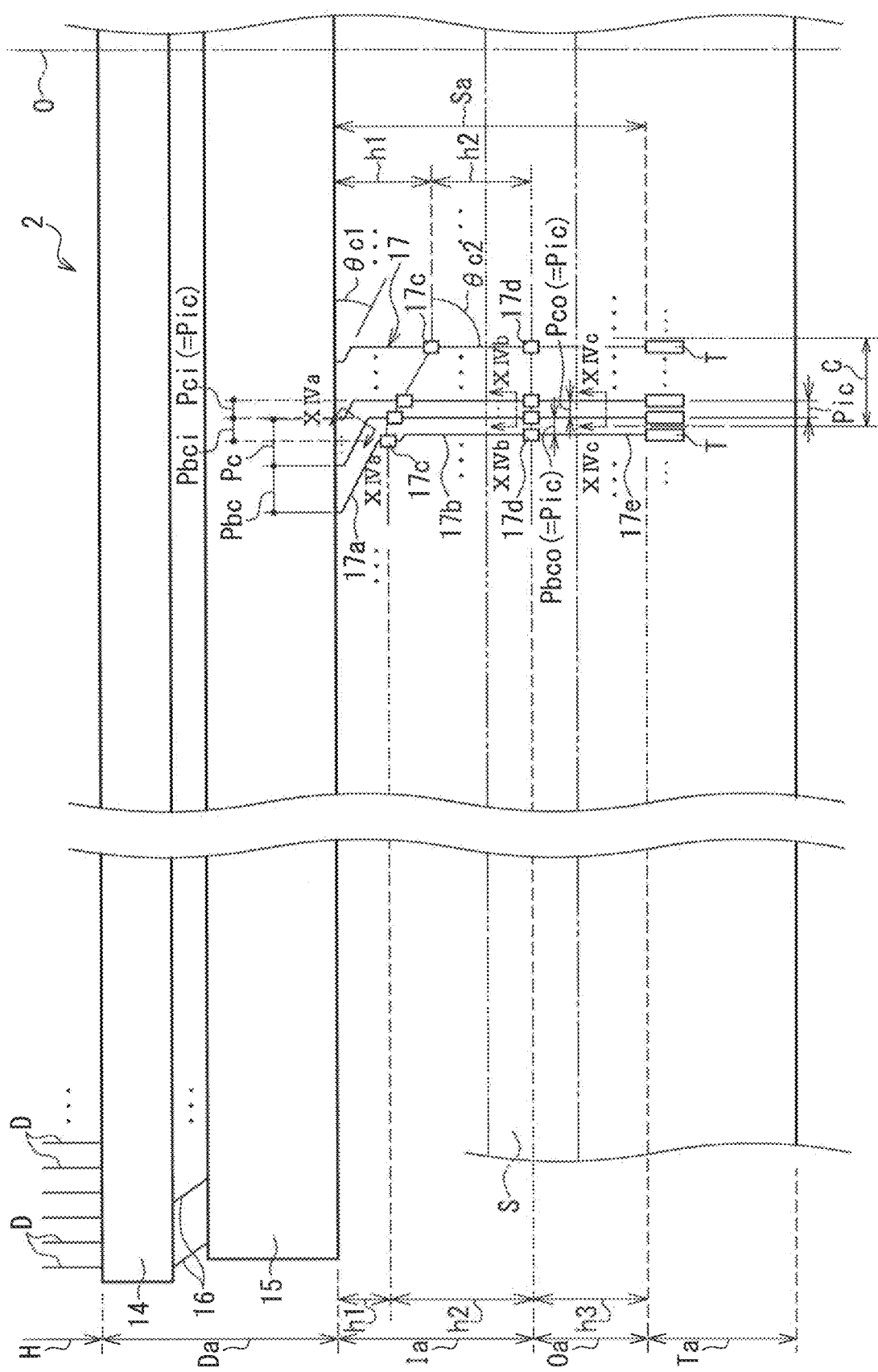
FIG. 13 is a diagram for explaining video signal lines of a third line group shown in FIG. 6.

Next, referring to FIGS. 13 to 14, the video signal lines 17 of the third line group C will be specifically described.

Figure 14A:
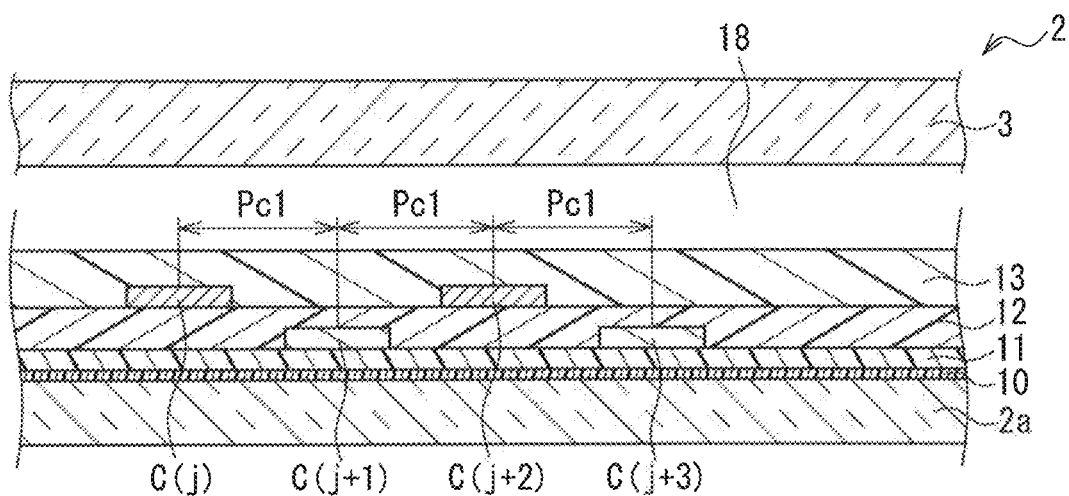
FIG. 14(*a*) is a cross-sectional view taken along the line XVa-XIVa in FIG. 13.
Figure 14B:
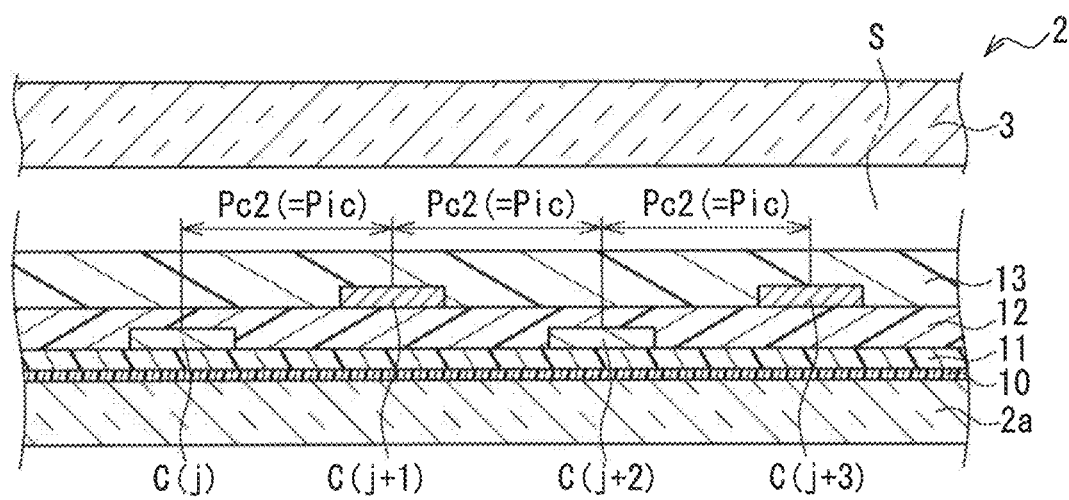
Figure 14C:
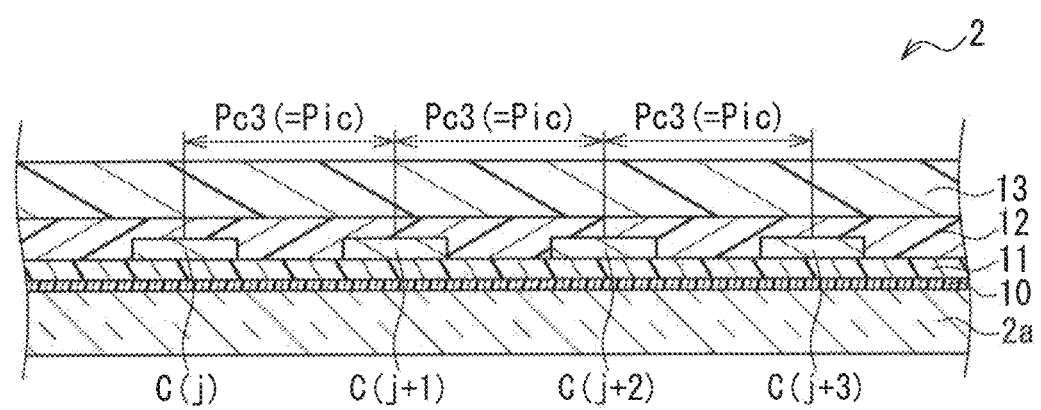

FIG. 13 is a diagram for explaining the video signal lines of the third line group shown in FIG. 6. FIG. 14(a) is a cross-sectional view taken along the line XIVa-XIVa in FIG. 13. FIG. 14(b) is a cross-sectional view taken along the line XIVb-XIVb in FIG. 13. FIG. 14(c) is a cross-sectional view taken along the line XIVc-XIVc in FIG. 13. In FIG. 13, for simplification, the video signal lines 17 other than the video signal lines 17 of the third line group C and one video signal line 17 of the adjacent second line group B are omitted.

As shown in FIG. 13, the video signal lines 17 of the third line group C are laid in the direction from the upper left to the lower right of the sheet of the drawing. The video signal line region Sa includes the inner line region Ia located closer to the matrix region H and the outer line region Oa located closer to the terminal region Ta when the sealing material S is defined as a boundary between the two regions. The inner line region Ia includes the first line portions 17a, the inner connection portions 17c, and the second line portions 17b in this order from the matrix region H side. The second line portions 17b in the inner line region Ia are electrically connected to the outer lines 17e in the outer line region Oa by the outer connection portions 17d. Therefore, each of the video signal lines 17 of the third line group C has a path that passes through the first line portion 17a, the inner connection portion 17c, the second line portion 17b, the outer connection portion 17d, the outer line 17e, and the terminal T when seen from the matrix region H side.

The first line portions 17a are drawn parallel to each other at a predetermined pitch (arrangement interval) Pc along one side of the matrix region H (i.e., the horizontal direction of the sheet of FIG. 13) in the direction from the inspection and protection circuit 15 to the terminal region Ta. Moreover, the first line portions 17a are drawn at a predetermined angle $\theta c1$ with respect to one side of the matrix region H. The first line portions 17a thus drawn are bent before being connected to the second line portions 17b to change the drawing direction, and then extend toward the terminal region Ta. Thus, in the third line group C, the positioning is made to connect the video signal lines 17 to the terminals T by bending the first line portions 17a rather than the outer lines 17e and the second line portions 17b.

As shown in FIG. 14(a), the first line portions 17a have the structure in which the second conductive layer and the first conductive layer are alternately repeated at a pitch Pc1. Specifically the C(j)-th first line portion 17a and the C(j+2)-th first line portion 17a are made of the second conductive layer, and the C(j+1)-th first line portion 17a and the C(j+3)-th first line portion 17a are made of the first conductive layer.

The pitch of the adjacent C(j)-th and C(j+1)-th first line portions 17a is Pc1. The pitch of the first line portions 17a present in the same layer, e.g., the pitch between the C(j)-th first line portion 17a and the C(j+2)-th first line portion 17a is 2×Pc1. Similarly the pitch between the C(j+1)-th first line portion 17a and the C(j+3)-th first line portion 17a is 2×Pc1.

The inner connection portions 17c are located in the positions that connect the first line portions 17a and the second line portions 17b, and are arranged so as to gradually move away from one side of the matrix region H. The pitch of the inner connection portions 17c along one side of the matrix region H is Pci. Moreover, the inner connection portions 17c are located in the positions that divide the interconnection length of the individual video signal lines 17 in the inner line region Ia into two equal parts in order to make the interconnection resistance of two adjacent video signal lines 17 uniform. Thus, the length of the first line portions 17a is equal to that of the second line portions 17b.

The second line portions 17b are drawn from the inner connection portions 17c toward the terminal region Ta at a predetermined angle $\theta c2$ with respect to one side of the matrix region H. In this case, the first line portions 17a are bent before reaching the inner connection portions 17c and extend at an angle of 90° with respect to one side of the matrix region H toward the terminal region Ta. Therefore, the drawing direction of the second line portions 17b from the inner connection portions 17c is at right angles to one side of the matrix region H, i.e., the angle $\theta c2$ is 90°.

As shown in FIG. 14(b), the second line portions 17b have the structure in which the second conductive layer and the first conductive layer are alternately repeated at a pitch Pc2. The first line portion 17a and the second line portion 17b that are present in the same path of each of the video signal lines 17 differ in their line materials. Specifically the C(j)-th second line portion 17b and the C(j+2)-th second line portion 17b are made of the first conductive layer, and the C(j+1)-th second line portion 17b and the C(j+3)-th second line portion 17b are made of the second conductive layer.

The pitch of the adjacent C(j)-th and C(j+1)-th second line portions 17b is Pc2. The pitch of the second line portions 17b in the same layer, e.g., the pitch between the C(j)-th second line portion 17b and the C(j+2)-th second line portion 17b is 2×Pc2. Similarly the pitch between the C(j+1)-th second line portion 17b and the C(j+3)-th second line portion 17b is 2×Pc2.

The outer connection portions 17d are located in the positions that connect the second line portions 17b and the outer lines 17e, and are arranged parallel to each other at predetermined intervals (Pco) along one side of the matrix region H. In this case, there are two types of the outer connection portions 17d. When the line materials of the second line portion 17b and the outer line 17e are different, the outer connection portion 17d functions as a line switching portion. When the line materials of the second line portion 17b and the outer line 17e are the same, a dummy outer connection portion 17dd is used. In an extreme case, the dummy outer connection portion 17dd is not required. Unless otherwise noted, the present specification does not make a distinction between the normal outer connection portion 17d and the dummy outer connection portion 17dd. Needless to say, however, whether the outer connection portion in question is normal or dummy can obviously be determined from the configuration of the second line portion 17b and the outer line 17e.

The outer lines 17e are drawn from the outer connection portions 17d toward the terminal region Ta at right angles (at an angle $\theta c3$ (not shown)) to the arrangement direction of the terminals T, i.e., one side of the matrix region H without any bending. As shown in FIG. 14(c), the outer lines 17e have the structure in which the first conductive layer is repeated at a pitch Pc3. Specifically all the C(j)-th, C(j+1)-th, C(j+2)-th, and C(j+3)-th outer lines 17e are made of the first conductive layer. The outer lines 17e extend to the terminals T without being bent in the middle of their paths. Therefore, the relationship between the pitch Pc3 of the outer lines 17e and the pitch Pic of the terminals T is Pc3=Pic.

The following is an explanation of the features and suitable routing of the video signal lines 17 of the third line group C. The third line group C is characterized in that the inner connection portions 17c are arranged so as to gradually move away from one side of the matrix region H. The reason and effect of this arrangement will be described below.

In the inner line region Ia, when the lines including a set of the first conductive layer and the second conductive layer that differ in sheet resistance are repeatedly laid, it is necessary to avoid a significant change in resistance of two adjacent video signal lines 17. For this purpose, the inner connection portions 17c should be located in the positions that divide the individual video signal lines 17 into two equal parts, and the line material should be changed in each of the inner connection portions 17c.

However, in the third line group C, the positioning of the video signal lines 17 and the terminals T is made by the curved first line portions 17a, and the lines having an angle of 90° with respect to one side of the matrix region H make up an increasing proportion of the interconnection distance in the inner line region Ia. Therefore, it requires some ingenuity to arrange the inner connection portions 17c. In other words, a repetitive arrangement of the inner connection portions 17c is not appropriate, and the arrangement should be adjusted positively.

In the active matrix substrate 2 of this embodiment, Pci<Pc, preferably Pci=Pic is satisfied, where Pci represents the pitch of the inner connection portions 17c along one side of the matrix region H and Pc represents the pitch at one end of the video signal lines 17 in the inner line region Ia. Moreover, the inner connection portions 17c are arranged on an oblique line extending in the lower right direction of the sheet of FIG. 13 so that each of the inner connection portions 17c gradually moves away from one side of the matrix region H in increments of Δc per pitch. In this manner, the inner connection portions 17c can be located in the vicinity of the positions that divide the interconnection length in the inner line region Ia into two equal parts. Thus, when the conditions are appropriately controlled, the length of the first line portions 17a can be equal to that of the second line portions 17b.

In order to achieve better routing, it is preferable that θb1=θ1l is satisfied, where θc1 is the angle indicating the drawing direction of the first line portions 17a, and θb1 is the angle indicating the drawing direction of the first line portions 17a of the second line group B. This prevents interference of the drawing direction of the video signal lines 17 of the third line group C with the video signal lines 17 of the adjacent second line group B.

(Video Signal Lines 17 of Fourth Line Group D)

Figure 15:
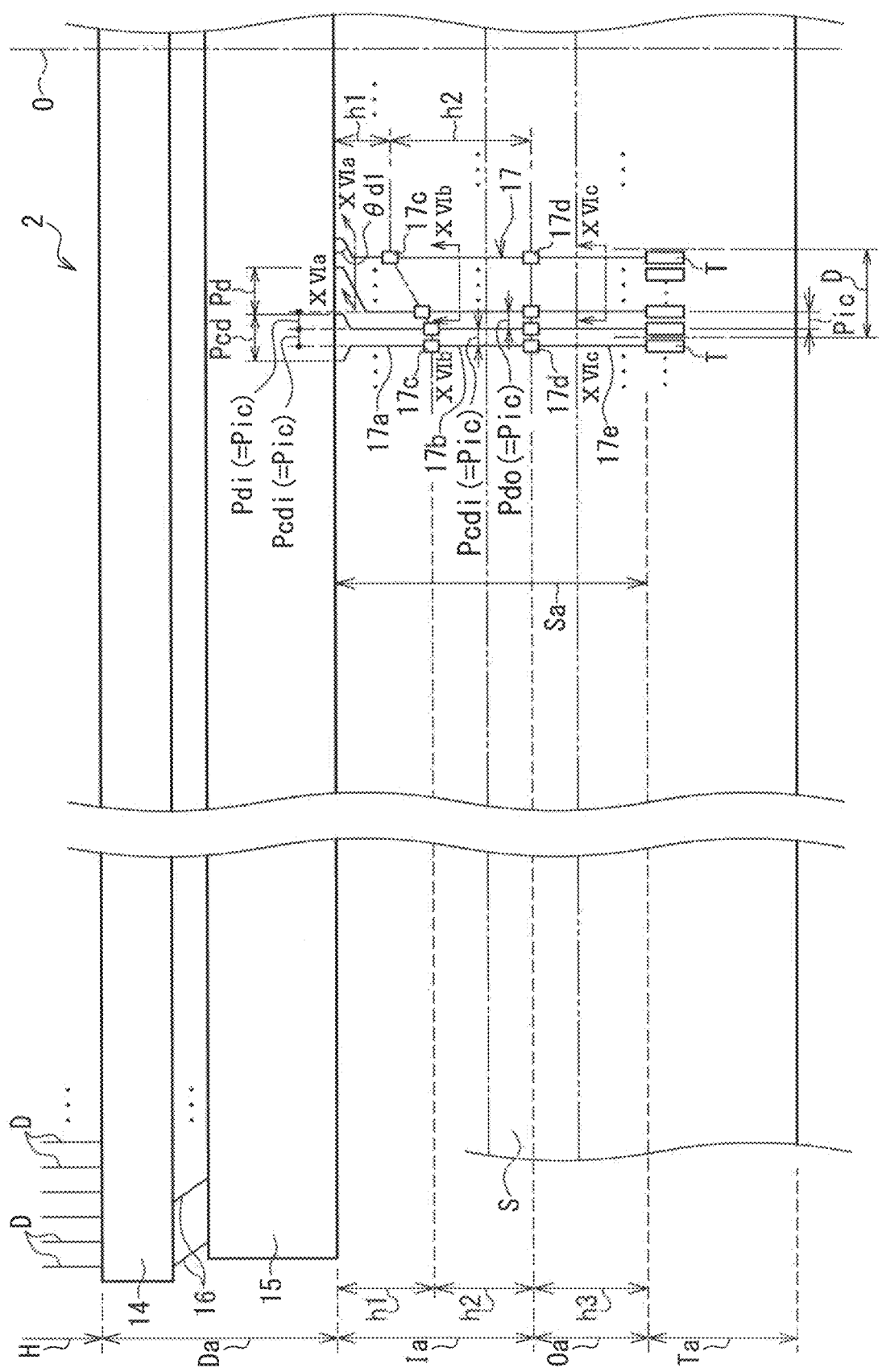
FIG. 15 is a diagram for explaining video signal lines of a fourth line group shown in FIG. 6.

Next, referring to FIGS. 15 to 16, the video signal lines 17 of the fourth line group D will be specifically described.

Figure 16A:
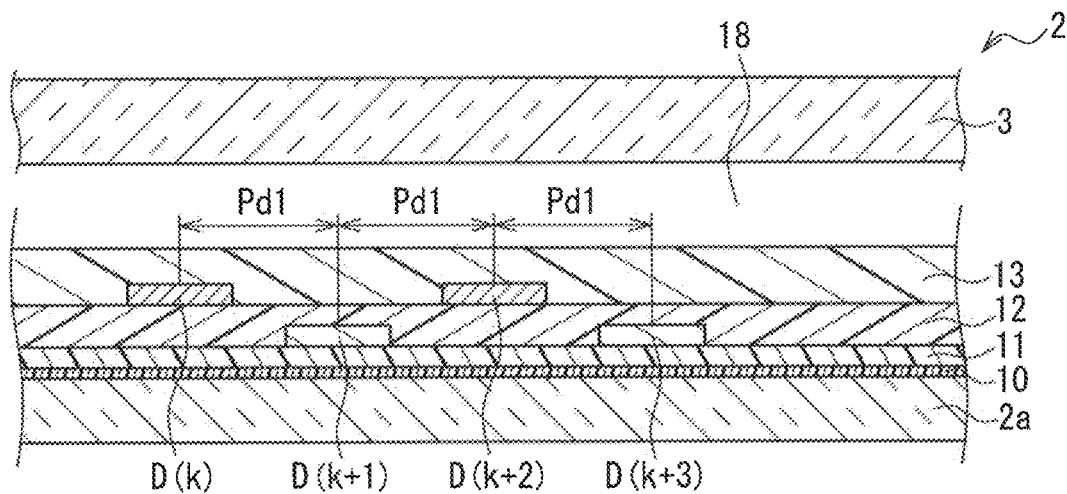
FIG. 16(*a*) is a cross-sectional view taken along the line XVIa-XVIa in FIG. 15.
Figure 16B:
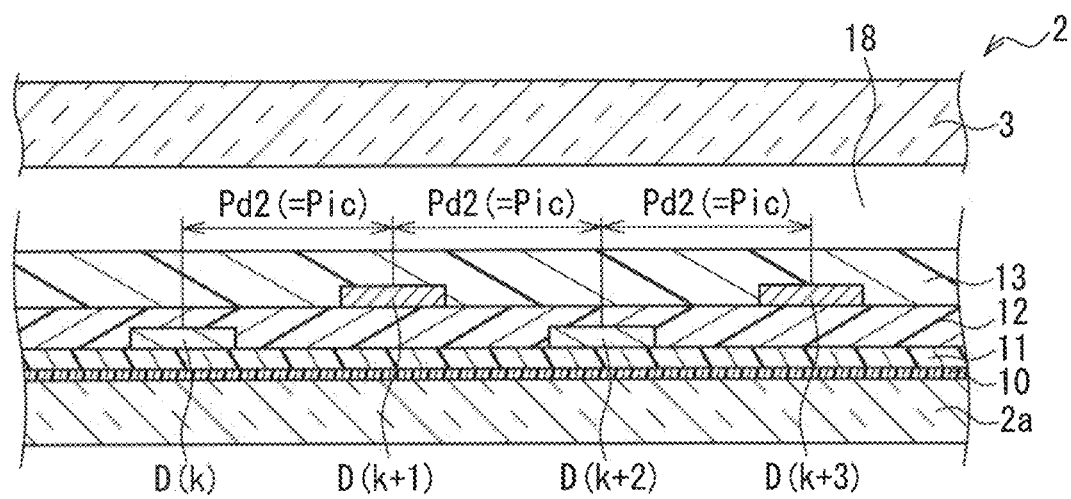
Figure 16C:
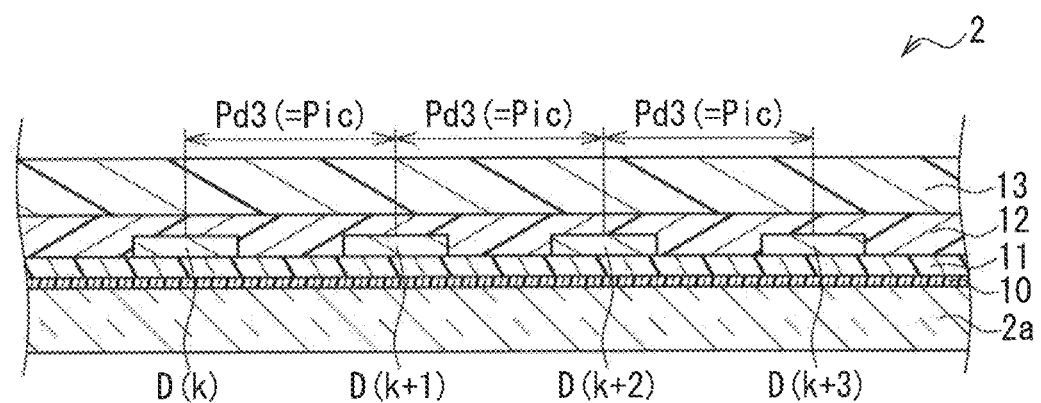

FIG. 15 is a diagram for explaining the video signal lines of the fourth line group shown in FIG. 6. FIG. 16(a) is a cross-sectional view taken along the line XVIa-XVIa in FIG. 15. FIG. 16(b) is a cross-sectional view taken along the line XVIb-XVIb in FIG. 15. FIG. 16(c) is a cross-sectional view taken along the line XVIc-XVIc in FIG. 15. In FIG. 15, for simplification, the video signal lines 17 other than the video signal lines 17 of the fourth line group D and one video signal line 17 of the adjacent third line group C are omitted.

As shown in FIG. 15, the video signal lines 17 of the fourth line group D are laid in the direction from the upper right to the lower left of the sheet of the drawing. The video signal line region Sa includes the inner line region Ia located closer to the matrix region H and the outer line region Oa located closer to the terminal region Ta when the sealing material S is defined as a boundary between the two regions. The inner line region Ia includes the first line portions 17a, the inner connection portions 17c, and the second line portions 17b in this order from the matrix region H side. The second line portions 17b in the inner line region Ia are electrically connected to the outer lines 17e in the outer line region Oa by the outer connection portions 17d. Therefore, each of the video signal lines 17 of the fourth line group D has a path that passes through the first line portion 17a, the inner connection portion 17c, the second line portion 17b, the outer connection portion 17d, the outer line 17e, and the terminal T when seen from the matrix region H side.

The first line portions 17a are drawn parallel to each other at a predetermined pitch (arrangement interval) Pd along one side of the matrix region H (i.e., the horizontal direction of the sheet of FIG. 15) in the direction from the inspection and protection circuit 15 to the terminal region Ta. Moreover, the first line portions 17a are drawn at a predetermined angle θd1 with respect to one side of the matrix region H. The first line portions 17a thus drawn are bent before being connected to the second line portions 17b to change the drawing direction, and then extend toward the terminal region Ta. Thus, in the fourth line group D, the positioning is made to connect the video signal lines 17 to the terminals T by bending the first line portions 17a rather than the outer lines 17e and the second line portions 17b.

As shown in FIG. 16(a), the first line portions 17a have the structure in which the second conductive layer and the first conductive layer are alternately repeated at a pitch Pd1. Specifically the D(k)-th first line portion 17a and the D(k+2)-th first line portion 17a are made of the second conductive layer, and the D(k+1)-th first line portion 17a and the D(k+3)-th first line portion 17a are made of the first conductive layer.

The pitch of the adjacent D(k)-th and D(k+1)-th first line portions 17a is Pd1. The pitch of the first line portions 17a present in the same layer, e.g., the pitch between the D(k)-th first line portion 17a and the D(k+2)-th first line portion 17a is 2×Pd1. Similarly the pitch between the D(k+1)-th first line portion 17a and the D(k+3)-th first line portion 17a is 2×Pd1.

The inner connection portions 17c are located in the positions that connect the first line portions 17a and the second line portions 17b, and are arranged so as to gradually get closer to one side of the matrix region H. The pitch of the inner connection portions 17c along one side of the matrix region H is Pdi. Moreover, the inner connection portions 17c are located in the positions that divide the interconnection length of the individual video signal lines 17 in the inner line region Ia into two equal parts in order to make the interconnection resistance of two adjacent video signal lines 17 uniform. Thus, the length of the first line portions 17a is equal to that of the second line portions 17b.

The second line portions 17b are drawn from the inner connection portions 17c toward the terminal region Ta at a predetermined angle θd2 (not shown) with respect to one side of the matrix region H. In this case, the first line portions 17a are bent before reaching the inner connection portions 17c and extend at an angle of 90° with respect to one side of the matrix region H toward the terminal region Ta. Therefore, the drawing direction of the second line portions 17b from the inner connection portions 17c is at right angles to one side of the matrix region H, i.e., the angle θd2 is 90°.

As shown in FIG. 16(b), the second line portions 17b have the structure in which the second conductive layer and the first conductive layer are alternately repeated at a pitch Pd2. The first line portion 17a and the second line portion 17b that are present in the same path of each of the video signal lines 17 differ in their line materials. Specifically the D(k)-th second line portion 17b and the D(k+2)-th second line portion 17b are made of the first conductive layer, and the D(k+1)-th second line portion 17b and the D(k+3)-th second line portion 17b are made of the second conductive layer.

The pitch of the adjacent D(k)-th and D(k+1)-th second line portions 17b is Pd2. The pitch of the second line portions 17b in the same layer, e.g., the pitch between the D(k)-th second line portion 17b and the D(k+2)-th second line portion 17b is 2×Pd2. Similarly the pitch between the D(k+1)-th second line portion 17b and the D(k+3)-th second line portion 17b is 2×Pd2.

The outer connection portions 17d are located in the positions that connect the second line portions 17b and the outer lines 17e, and are arranged parallel to each other at predetermined intervals (Pdo) along one side of the matrix region H. In this case, there are two types of the outer connection portions 17d. When the line materials of the second line portion 17b and the outer line 17e are different, the outer connection portion 17d functions as a line switching portion. When the line materials of the second line portion 17b and the outer line 17e are the same, a dummy outer connection portion 17dd is used. In an extreme case, the dummy outer connection portion 17dd is not required. Unless otherwise noted, the present specification does not make a distinction between the normal outer connection portion 17d and the dummy outer connection portion 17dd.

Needless to say, however, whether the outer connection portion in question is normal or dummy can obviously be determined from the configuration of the second line portion 17b and the outer line 17e.

The outer lines 17e are drawn from the outer connection portions 17d toward the terminal region Ta at right angles (at an angle θd3 (not shown)) to the arrangement direction of the terminals T, i.e., one side of the matrix region H without any bending. As shown in FIG. 16(c), the outer lines 17e have the structure in which the first conductive layer is repeated at a pitch Pd3. Specifically all the D(k)-th, D(k+1)-th, D(k+2)-th, and D(k+3)-th outer lines 17e are made of the first conductive layer. The outer lines 17e extend to the terminals T without being bent in the middle of their paths. Therefore, the relationship between the pitch Pd3 of the outer lines 17e and the pitch Pic of the terminals T is Pd3=Pic.

The following is an explanation of the features and suitable routing of the video signal lines 17 of the fourth line group D. The fourth line group D is characterized in that the inner connection portions 17c are arranged so as to gradually get closer to one side of the matrix region H. The reason and effect of this arrangement will be described below.

In the inner line region Ia, when the lines including a set of the first conductive layer and the second conductive layer that differ in sheet resistance are repeatedly laid, it is necessary to avoid a significant change in resistance of two adjacent video signal lines 17. For this purpose, the inner connection portions 17c should be located in the positions that divide the individual video signal lines 17 into two equal parts, and the line material should be changed in each of the inner connection portions 17c.

However, in the fourth line group D, the positioning of the video signal lines 17 and the terminals T is made by the curved first line portions 17a, and the lines having an angle of 90° with respect to one side of the matrix region H make up a decreasing proportion of the interconnection distance in the inner line region Ia. Therefore, it requires some ingenuity to arrange the inner connection portions 17c. In other words, a repetitive arrangement of the inner connection portions 17c is not appropriate, and the arrangement should be adjusted positively.

In the active matrix substrate 2 of this embodiment, Pdi<Pd, preferably Pdi=Pic is satisfied, where Pdi represents the pitch of the inner connection portions 17c along one side of the matrix region H and Pd represents the pitch at one end of the video signal lines 17 in the inner line region Ia. Moreover, the inner connection portions 17c are arranged on an oblique line extending in the upper right direction of the sheet of FIG. 15 so that each of the inner connection portions 17c gradually gets closer to one side of the matrix region H in increments of Δd per pitch. In this manner, the inner connection portions 17c can be located in the vicinity of the positions that divide the interconnection length in the inner line region Ia into two equal parts. Thus, when the conditions are appropriately controlled, the length of the first line portions 17a can be equal to that of the second line portions 17b.

(Video Signal Lines 17 of Fifth Line Group E)

Figure 17:
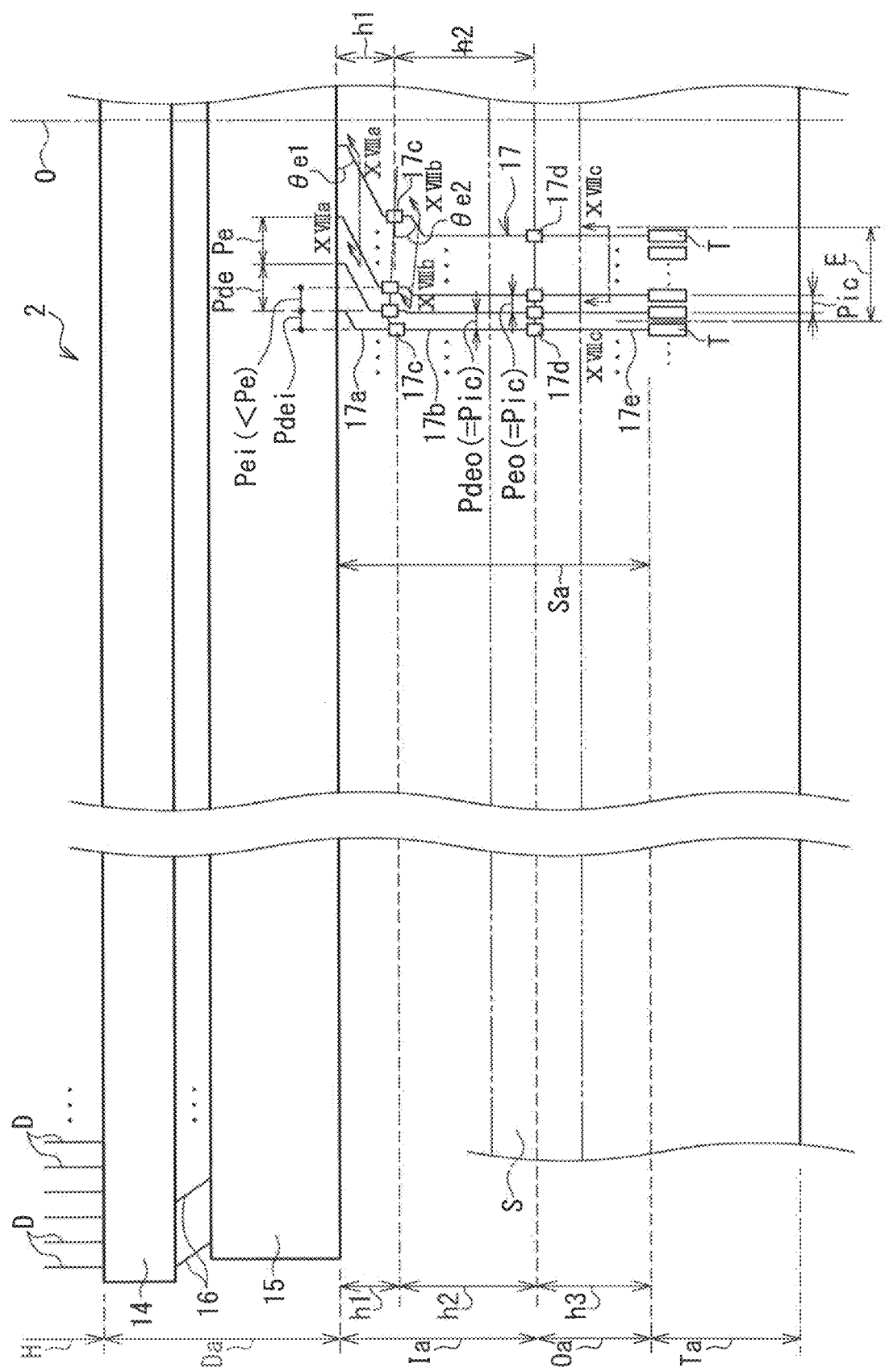
FIG. 17 is a diagram for explaining video signal lines of a fifth line group shown in FIG. 6.

Next, referring to FIGS. 17 to 18, the video signal lines 17 of the fifth line group E will be specifically described.

Figure 18A:
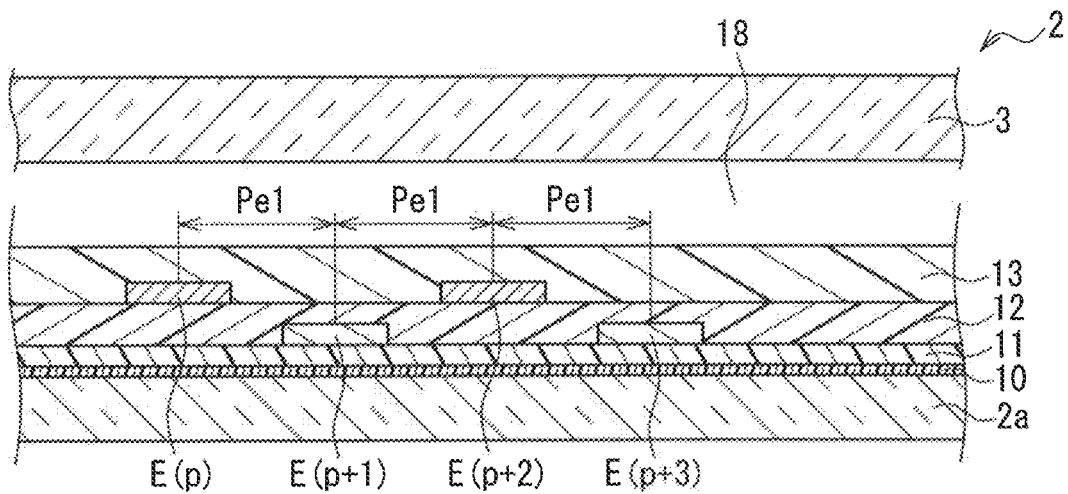
FIG. 18(*a*) is a cross-sectional view taken along the line XVIIIa-XVIIIa in FIG. 17.
Figure 18B:
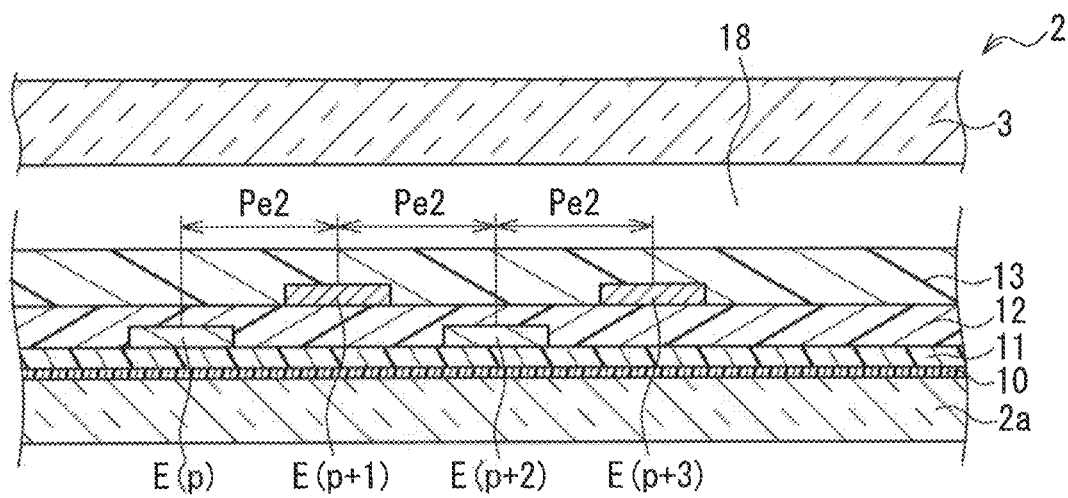
Figure 18C:
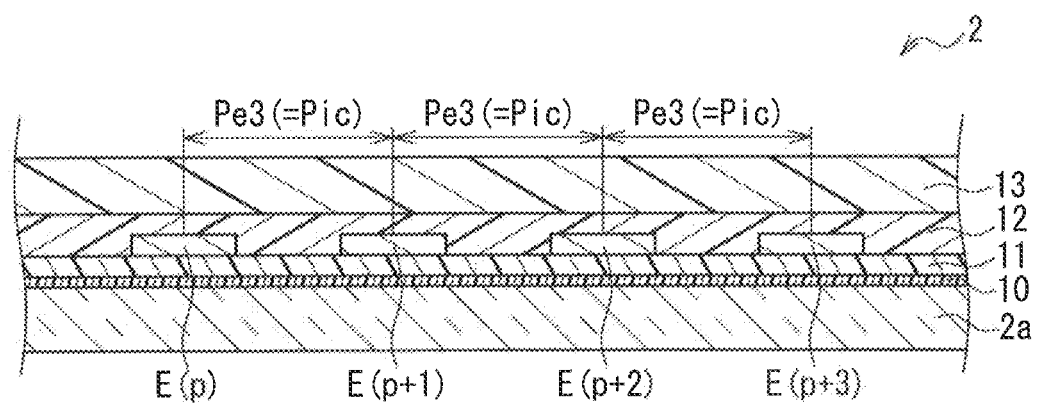

FIG. 17 is a diagram for explaining the video signal lines of the fifth line group shown in FIG. 6. FIG. 18(a) is a cross-sectional view taken along the line XVIIIa-XVIIIa in FIG. 17. FIG. 18(b) is a cross-sectional view taken along the line XVIIIb-XVIIIb in FIG. 17. FIG. 18(c) is a cross-sectional view taken along the line XVIIIc-XVIIIc in FIG. 17. In FIG. 17, for simplification, the video signal lines 17 other than the video signal lines 17 of the fifth line group E and one video signal line 17 of the adjacent fourth line group D are omitted.

As shown in FIG. 17, the video signal lines 17 of the fifth line group E are laid in the direction from the upper right to the lower left of the sheet of the drawing. The video signal line region Sa includes the inner line region Ia located closer to the matrix region H and the outer line region Oa located closer to the terminal region Ta when the sealing material S is defined as a boundary between the two regions. The inner line region Ia includes the first line portions 17a, the inner connection portions 17c, and the second line portions 17b in this order from the matrix region H side. The second line portions 17b in the inner line region Ia are electrically connected to the outer lines 17e in the outer line region Oa by the outer connection portions 17d. Therefore, each of the video signal lines 17 of the fifth line group E has a path that passes through the first line portion 17a, the inner connection portion 17c, the second line portion 17b, the outer connection portion 17d, the outer line 17e, and the terminal T when seen from the matrix region H side.

The first line portions 17a are drawn parallel to each other at a predetermined pitch (arrangement interval) Pe along one side of the matrix region H (i.e., the horizontal direction of the sheet of FIG. 17) in the direction from the inspection and protection circuit 15 to the terminal region Ta. Moreover, the first line portions 17a are drawn at a predetermined angle θe1 with respect to one side of the matrix region H.

As shown in FIG. 18(a), the first line portions 17a have the structure in which the second conductive layer and the first conductive layer are alternately repeated at a pitch Pe1. Specifically the E(p)-th first line portion 17a and the E(p+2)-th first line portion 17a are made of the second conductive layer, and the E(p+1)-th first line portion 17a and the E(p+3)-th first line portion 17a are made of the first conductive layer.

The pitch of the adjacent E(p)-th and E(p+1)-th first line portions 17a is Pe1. The pitch of the first line portions 17a present in the same layer, e.g., the pitch between the E(p)-th first line portion 17a and the E(p+2)-th first line portion 17a is 2×Pe1. Similarly the pitch between the E(p+1)-th first line portion 17a and the E(p+3)-th first line portion 17a is 2×Pe1.

The inner connection portions 17c are located in the positions that connect the first line portions 17a and the second line portions 17b, and are arranged so as to gradually move away from one side of the matrix region H. The pitch of the inner connection portions 17c along one side of the matrix region H is Pei. Moreover, the inner connection portions 17c are located in the positions that divide the interconnection length of the individual video signal lines 17 in the inner line region Ia into two equal parts in order to make the interconnection resistance of two adjacent video signal lines 17 uniform. Thus, the length of the first line portions 17a is equal to that of the second line portions 17b.

The second line portions 17b are drawn from the inner connection portions 17c toward the terminal region Ta at a predetermined angle θe2 with respect to one side of the matrix region H. As shown in FIG. 18(b), the second line portions 17b have the structure in which the second conductive layer and the first conductive layer are alternately repeated at a pitch Pe2. The first line portion 17a and the second line portion 17b that are present in the same path of each of the video signal lines 17 differ in their line materials. Specifically, the E(p)-th second line portion 17b and the E(p+2)-th second line portion 17b are made of the first conductive layer, and the E(p+1)-th second line portion 17b and the E(p+3)-th second line portion 17b are made of the second conductive layer.

The pitch of the adjacent E(p)-th and E(p+1)-th second line portions 17b is Pe2. The pitch of the second line portions 17b in the same layer, e.g., the pitch between the E(p)-th second line portion 17b and the E(p+2)-th second line portion 17b is 2×Pe2. Similarly the pitch between the E(p+1)-th second line portion 17b and the E(p+3)-th second line portion 17b is 2×Pe2.

The outer connection portions 17d are located in the positions that connect the second line portions 17b and the outer lines 17e, and are arranged parallel to each other at predetermined intervals (Peo) along one side of the matrix region H. In this case, there are two types of the outer connection portions 17d. When the line materials of the second line portion 17b and the outer line 17e are different, the outer connection portion 17d functions as a line switching portion. When the line materials of the second line portion 17b and the outer line 17e are the same, a dummy outer connection portion 17dd is used. In an extreme case, the dummy outer connection portion 17dd is not required. Unless otherwise noted, the present specification does not make a distinction between the normal outer connection portion 17d and the dummy outer connection portion 17dd. Needless to say, however, whether the outer connection portion in question is normal or dummy can obviously be determined from the configuration of the second line portion 17b and the outer line 17e.

The outer lines 17e are drawn from the outer connection portions 17d toward the terminal region Ta at right angles (at an angle θe3 (not shown)) to the arrangement direction of the terminals T, i.e., one side of the matrix region H without any bending. As shown in FIG. 18(c), the outer lines 17e have the structure in which the first conductive layer is repeated at a pitch Pe3. Specifically all the E(p)-th, E(p+1)-th, E(p+2)-th, and E(p+3)-th outer lines 17e are made of the first conductive layer. The outer lines 17e extend to the terminals T without being bent in the middle of their paths. Therefore, the relationship between the pitch Pe3 of the outer lines 17e and the pitch Pic of the terminals T is Pe3=Pic. Thus, in the fifth line group E, the positioning is made to connect the video signal lines 17 to the terminals T by bending the second line portions 17b rather than the outer lines 17e.

The following is an explanation of the features and suitable routing of the video signal lines 17 of the fifth line group E. The fifth line group E is characterized in that the inner connection portions 17c are arranged so as to gradually move away from one side of the matrix region H. The reason and effect of this arrangement will be described below.

In the inner line region Ia, when the lines including a set of the first conductive layer and the second conductive layer that differ in sheet resistance are repeatedly laid, it is necessary to avoid a significant change in resistance of two adjacent video signal lines 17. For this purpose, the inner connection portions 17c should be located in the positions that divide the individual video signal lines 17 into two equal parts, and the line material should be changed in each of the inner connection portions 17c.

However, in the fifth line group E, the positioning of the video signal lines 17 and the terminals T is made by the curved second line portion 17b, and the interconnection distance in the inner line region Ia becomes gradually longer. Therefore, it requires some ingenuity to arrange the inner connection portions 17c. In other words, a repetitive arrangement of the inner connection portions 17c is not appropriate, and the arrangement should be adjusted positively.

In the active matrix substrate 2 of this embodiment, Pei<Pe is satisfied, where Pei represents the pitch of the inner connection portions 17c along one side of the matrix region H and Pe represents the pitch at one end of the video signal lines 17 in the inner line region Ia. Moreover, the inner connection portions 17c are arranged on an oblique line extending in the lower right direction of the sheet of FIG. 17 so that each of the inner connection portions 17c gradually moves away from one side of the matrix region H in increments of Δe per pitch. In this manner, the inner connection portions 17c can be located in the vicinity of the positions that divide the interconnection length in the inner line region Ia into two equal parts. Thus, when the conditions are appropriately controlled, the length of the first line portions 17a can be equal to that of the second line portions 17b.

In order to achieve better routing, it is preferable that θe1=θd1 is satisfied, where θe1 is the angle indicating the drawing direction of the first line portions 17a, and θd1 is the angle indicating the drawing direction of the first line portions 17a of the fourth line group D. This prevents interference of the drawing direction of the video signal lines 17 of the fifth line group E with the video signal lines 17 of the adjacent fourth line group D.

In the fifth line group E, the angle θe1 indicating the drawing direction of the first line portions 17a is determined by the line pitch Pe1 and the drawing pitch Pe. The angle θe2 indicating the drawing direction of the second line portions 17b is determined by the line pitch Pe2, the drawing pitch Pei, and Δe. Since the cross-sectional structures and the line materials of the first line portions 17a and the second line portions 17b are considered to be the same, the relationship between the line pitch Pe1 of the first line portions 17a and the line pitch Pe2 of the second line portions 17b may be Pe1=Pe2. Accordingly Pe>Pei is most suitable to make the angle θe1 equal to the angle θe2.

(Optimization of First to Fifth Line Groups)

The video signal lines 17 of the first to fifth line groups A to E have been described above. The video signal lines 17 of the first to fifth line groups A to E are assembled to form a half of a fan shape. Therefore, the video signal lines 17 need to be optimized based on such an assembly. The optimization is performed by the following items (1), (2), (3), (4), (5), and (6). A preferred example of the outer lines 17e is performed by the following item (7).

Item (1)

When the total resistance of the resistance of the first line portion 17a and the resistance of the second line portion 17b does not change significantly between the video signal line 17 of any number and the adjacent video signal line 17, and the video signal lines 17 in the inner line region Ia are arranged at a narrow pitch, the inner connection portions 17c should be appropriately arranged.

Therefore, in the first line group A, the inner connection portions 17c are arranged parallel to one side of the matrix region H.

In the second line group B, the inner connection portions 17c are arranged at a predetermined angle with respect to one side of the matrix region H so as to gradually get closer to the matrix region H.

In the third line group C, the inner connection portions 17c are arranged at a predetermined angle with respect to one side of the matrix region H so as to gradually move away from the matrix region H.

In the fourth line group D, the inner connection portions 17c are arranged at a predetermined angle with respect to one side of the matrix region H so as to gradually get closer to the matrix region H.

In the fifth line group E, the inner connection portions 17c are arranged at a predetermined angle with respect to one side of the matrix region H so as to gradually move away from the matrix region H.

With the above configuration, even if the first to fifth line groups A to E are different from each other in the wiring structure of the video signal lines 17, the inner connection portions 17c can be located in the positions that divide the interconnection length in the inner line region Ia into two equal parts.

Item (2)

The video signal lines 17 in the inner line region Ia include the first line portions 17a, the inner connection portions 17c, and the second line portions 17b. Therefore, in order to achieve the shortest effective wiring, it is preferable that the drawing direction of the first line portions 17a is the same as that of the second line portions 17b in the vicinity of the inner connection portions 17c of any video signal lines 17 not only of the first to third line groups A to C, but also of the fourth and fifth line groups D and E.

For this reason, in the first line group A, Pa=Pai is satisfied, where Pa represents the arrangement interval at one end of the video signal lines 17 that are arranged parallel to one side of the matrix region H, and Pai represents the arrangement interval of the inner connection portions 17c that are arranged parallel to one side of the matrix region H.

In the second line group B, Pb>Pbi is satisfied, where Pb represents the arrangement interval at one end of the video signal lines 17 that are arranged parallel to one side of the matrix region H, and Pbi represents the arrangement interval of the inner connection portions 17c that are arranged parallel to one side of the matrix region H.

In the third line group C, Pc>Pci=Pic is satisfied, where Pc represents the arrangement interval at one end of the video signal lines 17 that are arranged parallel to one side of the matrix region H, Pci represents the arrangement interval of the inner connection portions 17c that are arranged parallel to one side of the matrix region H, and Pic represents the arrangement interval of the terminals T in the terminal region Ta that are arranged parallel to one side of the matrix region H.

In the fourth line group D, Pd>Pdi=Pic is satisfied, where Pd represents the arrangement interval at one end of the video signal lines 17 that are arranged parallel to one side of the matrix region H, Pdi represents the arrangement interval of the inner connection portions 17c that are arranged parallel to one side of the matrix region H, and Pic represents the arrangement interval of the terminals T in the terminal region Ta that are arranged parallel to one side of the matrix region H.

In the fifth line group E, Pe>Pei is satisfied, where Pe represents the arrangement interval at one end of the video signal lines 17 that are arranged parallel to one side of the matrix region H, and Pei represents the arrangement interval of the inner connection portions 17c that are arranged parallel to one side of the matrix region H.

In addition to the above, it is preferable that any video signal lines 17 of the first to third line groups A to C are drawn parallel to each other from the inspection and protection circuit 15 in the same direction, and that any video signal lines 17 of the fourth and fifth line groups D and E are also drawn parallel to each other from the inspection and protection circuit 15 in the same direction.

For this reason, Pa=Pb=Pc and Pd=Pe are satisfied.

Specifically any video signal lines 17 in the inner line region Ia of the first to fifth line groups A to E are made of two materials: the first conductive layer and the second conductive layer. Therefore, any video signal lines 17 in the inner line region Ia can have the same line width and spacing (pitch). Thus, when Pa=Pb=Pc is satisfied, the directions in which the video signal lines 17 of the first to third line groups A to C are drawn from the inspection and protection circuit 15 are aligned with each other. Moreover, when Pd=Pe is satisfied, the directions in which the video signal lines 17 of the fourth and fifth line groups D and E are drawn from the inspection and protection circuit 15 are aligned with each other.

In summary the following formulas (1) to (4) and (10) may be satisfied for the first to third line groups A to C.

$$Pa=Pai \qquad (1)$$

$$Pb>Pbi \qquad (2)$$

$$Pc>Pci \qquad (3)$$

$$Pa=Pb=Pc \qquad (4)$$

$$Pci=Pic \qquad (10)$$

The following formulas (a) to (c) may be satisfied for the fourth and fifth line groups D and E.

$$Pd>Pdi=Pic \qquad (a)$$

$$Pe>Pei \qquad (b)$$

$$Pd=Pe \qquad (c)$$

Item (3)

When the drawing direction of the first line portions 17a can be the same as that of the second line portions 17b in the vicinity of the inner connection portions 17c, it is more preferable that the drawing directions of the first line portions 17a of the first to third line groups A to C are aligned, and that the drawing directions of the first line portions 17a of the fourth and fifth line groups D and E are aligned.

Therefore, in the first line group A, the angle indicating the drawing direction of the first line portions 17a of the video signal lines 17 with respect to one side of the matrix region H is θa1, and the angle indicating the drawing direction of the second line portions 17b of the video signal lines 17 with respect to one side of the matrix regions H is θa2.

In the second line group B, the angle indicating the drawing direction of the first line portions 17a of the video signal lines 17 with respect to one side of the matrix region H is θb1, and the angle indicating the drawing direction of the second line portions 17b of the video signal lines 17 with respect to one side of the matrix region H is θb2.

In the third line group C, the angle indicating the drawing direction of the first line portions 17a of the video signal lines 17 with respect to one side of the matrix region H is θc1, and the angle indicating the drawing direction of the second line portions 17b of the video signal lines 17 with respect to one side of the matrix region H is θc2. Under these conditions, the following formulas (5) and (6) may be satisfied.

$$\theta a1=\theta b1=\theta c1=\theta a2=\theta b2 \quad (5)$$

$$\theta c2=90° \quad (6)$$

Consequently the video signal lines 17 in the inner line region Ia of the first to third line groups A to C can be drawn parallel to each other. This can easily improve the efficiency in the layout of the routing.

Further, in the fourth line group D, the angle indicating the drawing direction of the first line portions 17a of the video signal lines 17 with respect to one side of the matrix region H is θd1, and the angle indicating the drawing direction of the second line portions 17b of the video signal lines 17 with respect to one side of the matrix region H is θd2.

In the fifth line group E, the angle indicating the drawing direction of the first line portions 17a of the video signal lines 17 with respect to one side of the matrix region H is θe1, and the angle indicating the drawing direction of the second line portions 17b of the video signal lines 17 with respect to one side of the matrix region H is θe2. Under these conditions, the following formulas (d) and (e) may be satisfied.

$$\theta d1=\theta e1=\theta e2 \quad (d)$$

$$\theta d2=90° \quad (e)$$

Consequently the video signal lines 17 in the inner line region Ia of the fourth and fifth line groups D and E can be drawn parallel to each other. This can easily improve the efficiency in the layout of the routing.

Item (4)

As described above, since the video signal lines 17 in the inner line region Ia can be drawn parallel to each other, there is no need to maintain a large area between each of the first to third line groups A to C.

Therefore, in the boundary between the first line group A and the second line group B, the arrangement interval at one end of the video signal lines 17 that are arranged parallel to one side of the matrix region H is represented by Pab.

In the boundary between the second line group B and the third line group C, the arrangement interval at one end of the video signal lines 17 that are arranged parallel to one side of the matrix region H is represented by Pbc. Under these conditions, the following formula (7) may be satisfied.

$$Pa=Pab=Pb=Pbc=Pc \quad (7)$$

This can prevent an unnecessary empty space from being formed in the boundary between the first line group A and the second line group B and in the boundary between the second line group B and the third line group C.

Moreover, there is no need to maintain a large area between the fourth line group D and the fifth line group E.

Therefore, in the boundary between the fourth line group D and the fifth line group E, the arrangement interval at one end of the video signal lines 17 that are arranged parallel to one side of the matrix region H is represented by Pde. Under these conditions, the following formula (f may be satisfied.

$$Pd=Pde=Pe \quad (f)$$

This can prevent an unnecessary empty space from being formed in the boundary between the fourth line group D and the fifth line group E.

Item (5)

In the boundary between the first line group A and the second line group B, the arrangement interval of the inner connection portions 17c that are arranged parallel to one side of the matrix region H is represented by Pabi. Under these conditions, the following formula (8) may be satisfied.

$$Pai \neq Pabi \neq Pbi \quad (8)$$

Although Pai>Pbi is satisfied, Pai=Pabi or Pabi=Pbi can be inconvenient depending on the positional relationship between the first line group A and the second line group B. However, based on Pai≠Pabi≠Pbi, Pabi with a size independent of Pai and Pbi is intentionally provided for positioning of the inner connection portions 17c, as described above. Preferably Pai>Pabi>Pbi is satisfied. This can ensure the degree of freedom of routing.

Item (6)

In the boundary between the second line group B and the third line group C, the arrangement interval of the inner connection portions 17c with respect to one side of the matrix region H is represented by Pbci. Under these conditions, the following formula (9) may be satisfied.

$$Pbi \neq Pbci \neq Pci \quad (9)$$

Although Pbi>Pci is satisfied, Pbi=Pbci or Pbci=Pci can be inconvenient depending on the positional relationship between the second line group B and the third line group C. However, based on Pbi≠Pbci≠Pci, Pbci with a size independent of Pbi and Pci is intentionally provided for positioning of the inner connection portions 17c, as described above. Preferably Pbi>Pbci>Pci is satisfied. This can ensure the degree of freedom of routing.

The same is true for the boundary between the fourth line group D and the fifth line group E.

In the boundary between the fourth line group D and the fifth line group E, the arrangement interval of the inner connection portions 17c with respect to one side of the matrix region H is represented by Pdei. Under these conditions, the following formula (g) may be satisfied.

$$Pdi \neq Pdei \neq Pei \quad (g)$$

Although Pdi<Pei is satisfied, Pdi=Pdei or Pdei=Pei can be inconvenient depending on the positional relationship between the fourth line group D and the fifth line group E. However, based on Pdi≠Pdei≠Pei, Pdei with a size independent of Pdi and Ped is intentionally provided for positioning of the inner connection portions 17c, as described above. Preferably Pdi<Pdei<Pei is satisfied. This can ensure the degree of freedom of routing.

Item (7)

In the video signal line region Sa, it is preferable that a first video signal line 17 and a second video signal line 17 extending adjacent to the first video signal line 17 are alternately repeated. The first video signal line 17 includes an inner line portion that includes the first line portion 17a and the second line portion 17b, and an outer line portion that includes the outer line 17e. The second video signal line 17 includes an inner line portion that includes the first line portion 17a and the second line portion 17b, and an outer line portion that includes the outer connection portion 17d and the outer line 17e. Moreover, it is preferable that the outer connection portions 17d of the first to third line groups A to C are arranged parallel to one side of the active matrix substrate 2 in which the terminals T are provided. With this configuration, the sealing material S provided above the outer connection portions 17d can be in the form of a simple straight line. Thus, the sealing material S can be easily formed.

In the video signal line region Sa, it is preferable that a first video signal line 17 and a second video signal line 17 extending adjacent to the first video signal line 17 are alternately repeated. The first video signal line 17 includes an inner line portion that includes the first line portion 17a and the second line portion 17b, and an outer line portion that includes the outer line 17e. The second video signal line 17 includes an inner line portion that includes the first line portion 17a and the second line portion 17b, and an outer line portion that includes the outer connection portion 17d and the outer line 17e. Moreover, it is preferable that the outer connection portions 17d of the fourth and fifth line groups D and E are arranged parallel to one side of the active matrix substrate 2 in which the terminals T are provided. With this configuration, the sealing material S provided above the outer connection portions 17d can be in the form of a simple straight line. Thus, the sealing material S can be easily formed.

As described above, it is preferable that the outer connection portions 17d of the first to fifth line groups A to E are arranged parallel to one side of the active matrix substrate 2 in which the terminals T are provided. With this configuration, the sealing material S provided above the outer connection portions 17d can be a simple straight line almost over the entire length of one side of the liquid crystal display device 1. Thus, the sealing material S can be most easily formed.

(Sixth to tenth line groups Ey to Ay)

Figure 19:
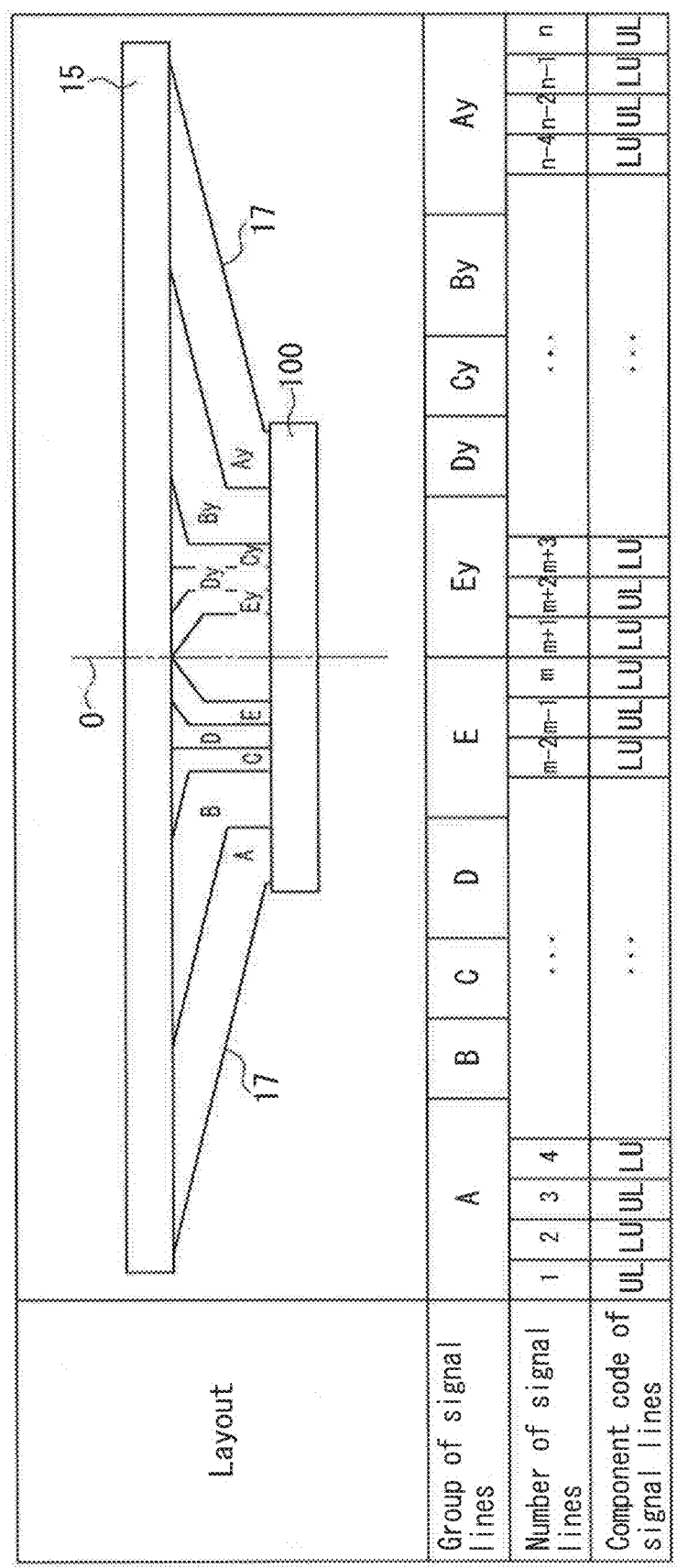
FIG. 19 is a plan view for explaining the layout and wiring structure of video signal lines in the active matrix substrate.

Next, referring also to FIG. 19, the sixth to tenth line groups Ey to Ay will be specifically described.

FIG. 19 is a plan view for explaining the layout and wiring structure of the video signal lines in the active matrix substrate.

As described above, the line group without the letter y such as "the first line group A" and the line group with the letter y such as "the tenth line group Ay" are positioned symmetrically with respect to the Y axis 0 in FIG. 19. Similarly the second and ninth line groups B and By, the third and eighth line groups C and Cy the fourth and seventh line groups D and Dy and the fifth and sixth line groups E and Ey are each positioned symmetrically with respect to the Y axis 0 in FIG. 19.

Therefore, when the first to tenth line groups A to Ay are seen from the left side of the sheet of FIG. 19, the first line group A, the second line group B, the third line group C, the fourth line group D, the fifth line group E, the sixth line group Ey the seventh line group Dy the eighth line group Cy the ninth line group By, and the tenth line group Ay are arranged in this order.

In the active matrix substrate 2 of this embodiment, the first line portions 17a and the second line portions 17b in the inner line region Ia are made of predetermined conductive layers (metal films). In FIG. 19, the second conductive layer (upper-layer metal film) is represented by "U" and the first conductive layer (lower-layer metal film) is represented by "L". Accordingly "UL" in FIG. 19 means that the first line portions 17a are made of the second conductive layer and the second line portions 17b are made of the first conductive layer when seen from the matrix region H (inspection and protection circuit 15) side. Moreover, "LU" in FIG. 19 means that the first line portions 17a are made of the first conductive layer and the second line portions 17b are made of the second conductive layer when seen from the matrix region H (inspection and protection circuit 15) side.

In the configuration shown in FIG. 19, the m-th video signal line 17 and the (m+1)-th video signal line 17 have the same structure of "LU". In other words, the first line portions 17a of these video signal lines 17 are both made of the first conductive layer, and the second line portions 17b of these video signal lines 17 are both made of the second conductive layer. Thus, the same line portion of the adjacent video signal lines 17 may use the same material even in the inner line region Ia. This is because the m-th video signal line 17 and the (m+1)-th video signal line 17 are not drawn parallel to each other, so that the distance between the lines is large enough to reduce the possibility of a short circuit due to foreign matters.

In the active matrix substrate 2 of this embodiment having the above configuration, a plurality of video signal lines (signal lines) 17 are laid in the inner line region (line region) Ia between the matrix region H and the terminal region Ta, and the inner line region Ia is defined so that the line pitch becomes narrower in the direction from the matrix region H to the terminal region Ta. Each of the video signal lines 17 includes the first line portion 17a provided on the matrix region H side, the second line portion 17b provided on the terminal region Ta side, and the inner connection portion (connection portion) 17c that connects the first line portion 17a and the second line portion 17b. In the video signal lines 17, the first line portion 17a and the second line portion 17b of one of two adjacent video signal lines 17 are made of the first conductive layer and the second conductive layer, respectively which are different from each other, and the first line portion 17a and the second line portion 17b of the other of the two adjacent video signal lines 17 are made of the second conductive layer and the first conductive layer, respectively. Moreover, the position of the inner connection portion 17c of each of the video signal lines 17 is determined in accordance with the layout position of that video signal line 17 in the line region. Thus, unlike the conventional examples, this embodiment can provide the active matrix substrate 2 in which the video signal lines 17 are laid with the line pitch becoming narrower, and a change in resistance of two adjacent video signal lines 17 is small even if each of the video signal lines 17 includes two conductive layers that differ in sheet resistance.

In this embodiment, since the video signal lines 17 are laid to form a fan shape as described above, the frame of the active matrix substrate 2 can be reduced. Therefore, it is possible, e.g., to increase the number of the active matrix substrates 2 that may be cut out from the motherboard, and also to reduce the manufacturing cost of the liquid crystal display device 1 as well as the active matrix substrate 2. Moreover, the use of this liquid crystal display device 1 will lead to a reduction in size and weight of display apparatuses or electronic apparatuses.

In the active matrix substrate 2 of this embodiment, the video signal lines 17 can be routed to form a fan shape that tapers more sharply for the same size of the frame. Therefore, the driver IC can be made smaller, e.g., relative to the inspection and protection circuit 15. Accordingly an inexpensive driver IC can be used. This can reduce the cost of the active matrix substrate 2 and the liquid crystal display device 1.

This embodiment uses the active matrix substrate 2 in which a plurality of video signal lines 17 are laid with the line pitch becoming narrower, and a change in resistance of two adjacent video signal lines 17 is small even if each of the video signal lines includes the first and second conductive layers that differ in sheet resistance. Therefore, a compact liquid crystal display device (display device) 1 with excellent display quality can be easily provided.

Modified Example 1

Figure 20:
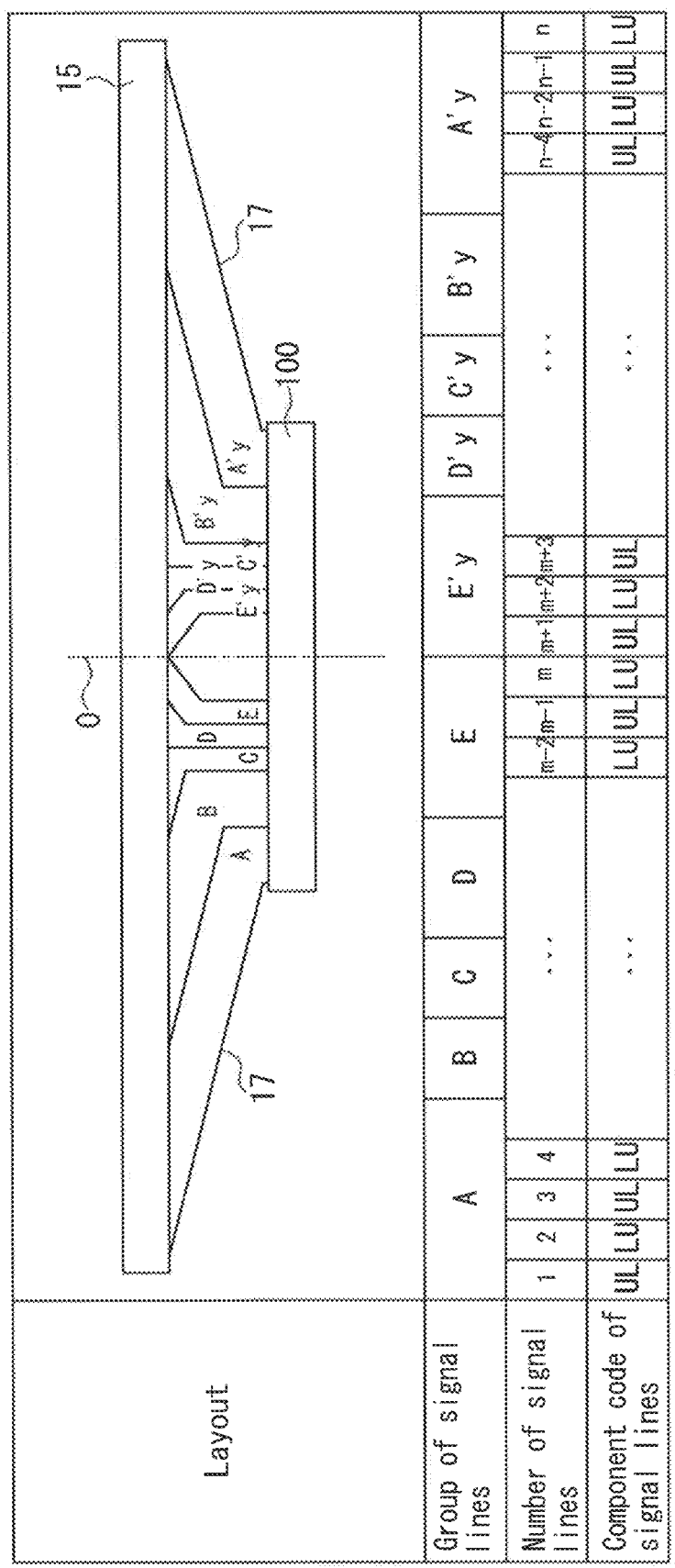
FIG. 20 is a plan view for explaining Modified Example 1 of the layout and wiring structure of video signal lines in the active matrix substrate.

FIG. 20 is a plan view for explaining the layout and wiring structure of the video signal lines in the active matrix substrate.

In FIG. 20, Modified Example 1 mainly differs from Embodiment 1 in the following point. There are five pairs of line groups, in each of which two line groups are symmetrical with respect to the Y axis, and the conductive layers of the first and second line portions of one line group are different from those of the first and second line portions of the other line group. The same components as those of Embodiment 1 are denoted by the same reference numerals, and the explanation will not be repeated.

In the active matrix substrate 2 of Modified Example 1, the first line group A, the second line group B, the third line group C, the fourth line group D, the fifth line group E, the sixth line group E'y the seventh line group D'y the eighth line group C'y the ninth line group B'y and the tenth line group A'y are arranged in this order when seen from the left side of the sheet of FIG. 20.

As described above, the line group without the letter y such as "the first line group A" and the line group with the letter y such as "the tenth line group A'y" are positioned symmetrically with respect to the Y axis 0 in FIG. 20. The same is true for the second and ninth line groups B and B'y the third and eighth line groups C and C'y the fourth and seventh line groups D and D'y and the fifth and sixth line groups E and E'y.

The addition of the mark ' (apostrophe) to the line group such as the tenth line group A'y indicates that the line material of the first line portions 17a and the line material of the second line portions 17b in the inner line region Ia are replaced with each other, as compared to the line group without the mark '.

Specifically in the first line group A, the first line portions 17a are made of the second conductive layer and the second line portions 17b are made of the first conductive layer in the inner line region Ia. On the other hand, in the tenth line group A'y that is symmetrical to the first line group A with respect to the Y axis 0 in FIG. 20, the first line portions 17a are made of the first conductive layer and the second line portions 17b are made of the second conductive layer in the inner line region Ia.

In the configuration shown in FIG. 20, the m-th video signal line 17 and the (m+1)-th video signal line 17 use the same line material, but are not drawn parallel to each other in the inner line region Ia. Therefore, even if the fifth line group E is close to the sixth line group E'y it is possible to suppress a short circuit between the lines due to foreign matters.

With the above configuration, Modified Example 1 can have the same effects as those of Embodiment 1.

Modified Example 2

Figure 21:
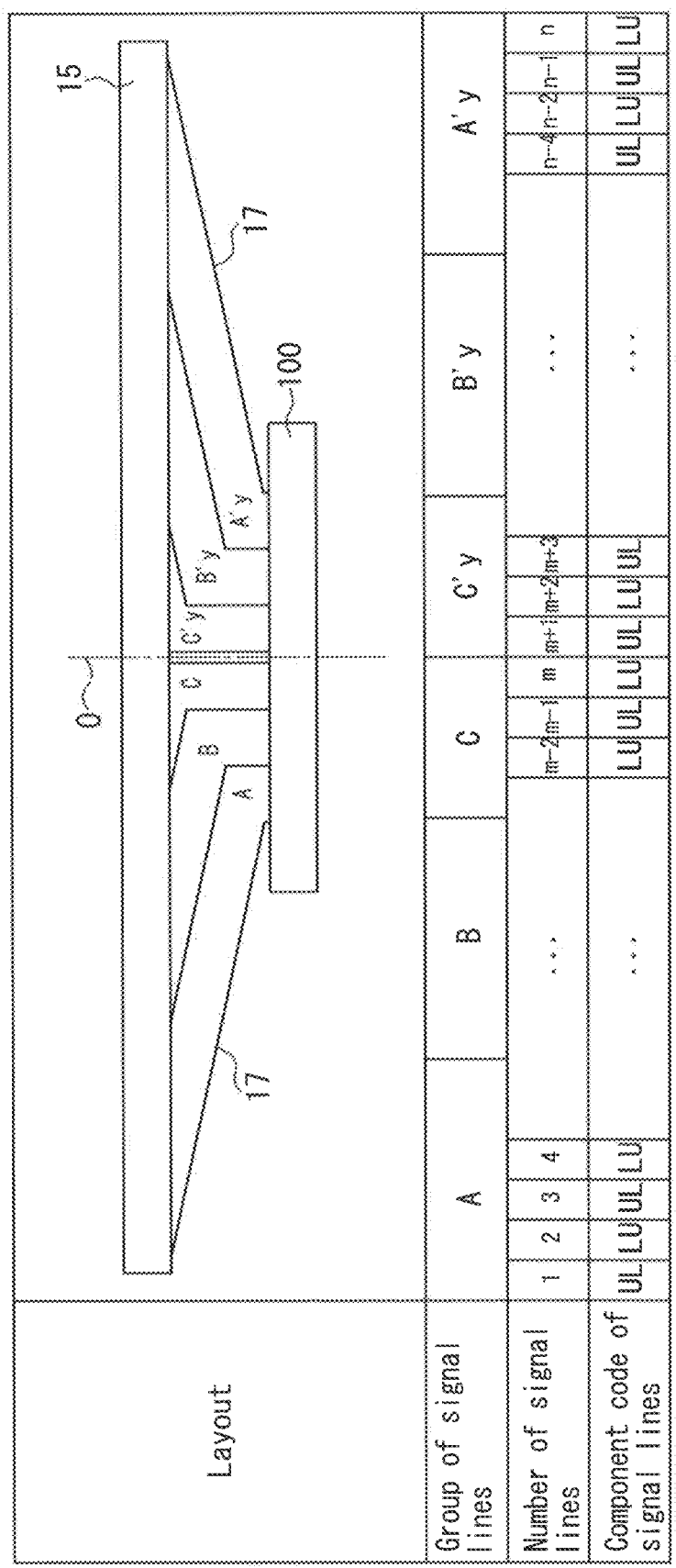
FIG. 21 is a plan view for explaining Modified Example 2 of the layout and wiring structure of video signal lines in the active matrix substrate.

FIG. 21 is a plan view for explaining the layout and wiring structure of the video signal lines in the active matrix substrate.

In FIG. 21, Modified Example 2 mainly differs from Embodiment 1 in the following point. The fourth and fifth line groups and their corresponding line groups are removed, and three pairs of line groups, in each of which two line groups are symmetrical with respect to the Y axis, are provided. The same components as those of Embodiment 1 are denoted by the same reference numerals, and the explanation will not be repeated.

In the active matrix substrate 2 of Modified Example 2, the first line group A, the second line group B, the third line group C, the eighth line group C'y the ninth line group B'y and the tenth line group A'y are arranged in this order when seen from the left side of the sheet of FIG. 21.

As described above, the line group without the letter y such as "the first line group A" and the line group with the letter y such as "the tenth line group A'y" are positioned symmetrically with respect to the Y axis 0 in FIG. 21. The same is true for the second and ninth line groups B and B'y and the third and eighth line groups C and C'y.

The addition of the mark ' (apostrophe) to the line group such as the tenth line group A'y indicates that the line material of the first line portions 17a and the line material of the second line portions 17b in the inner line region Ia are replaced with each other, as compared to the line group without the mark '.

Specifically in the first line group A, the first line portions 17a are made of the second conductive layer and the second line portions 17b are made of the first conductive layer in the inner line region Ia. On the other hand, in the tenth line group A'y that is symmetrical to the first line group A with respect to the Y axis 0 in FIG. 21, the first line portions 17a are made of the first conductive layer and the second line portions 17b are made of the second conductive layer in the inner line region Ia.

With the above configuration, Modified Example 2 can have the same effects as those of Embodiment 1.

Modified Example 3

Figure 22:
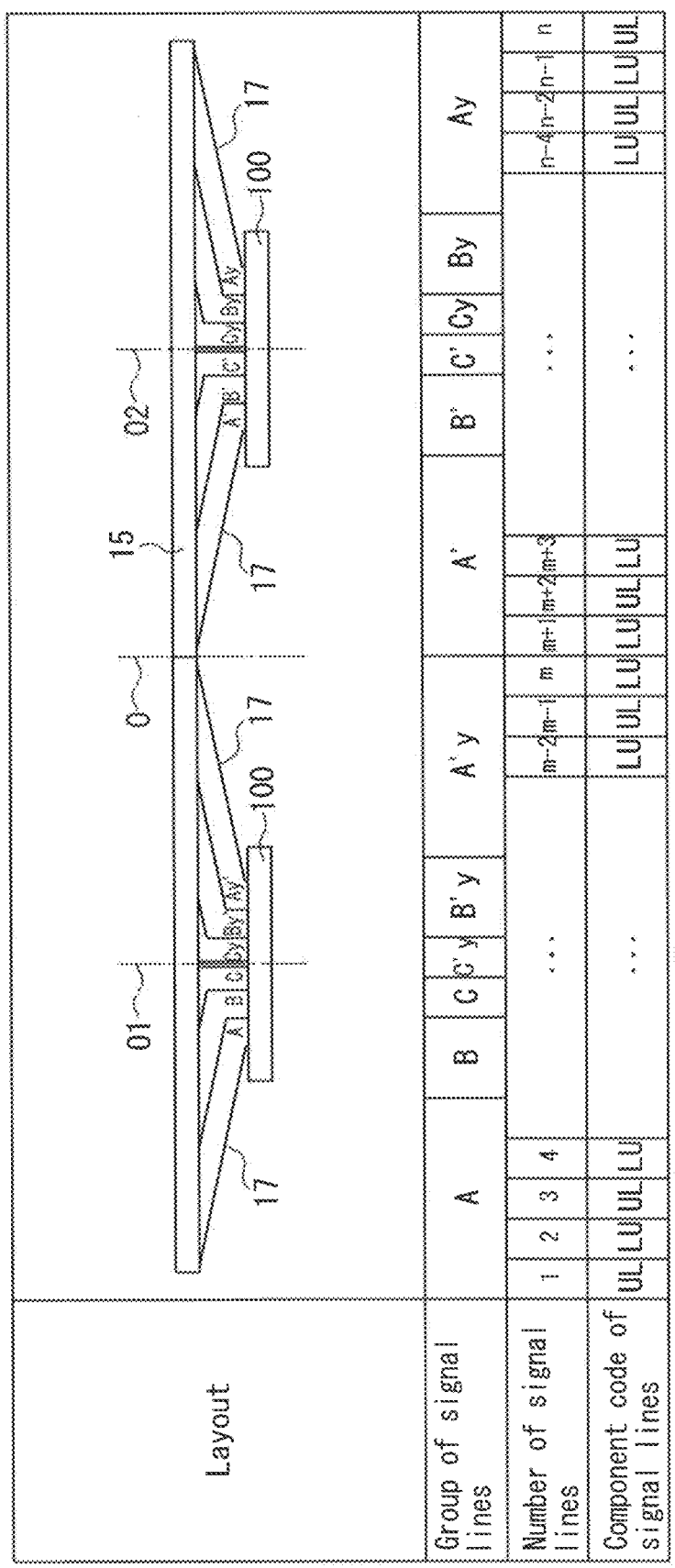
FIG. 22 is a plan view for explaining Modified Example 3 of the layout and wiring structure of video signal lines in the active matrix substrate.

FIG. 22 is a plan view for explaining the layout and wiring structure of the video signal lines in the active matrix substrate.

In FIG. 22, Modified Example 3 mainly differs from Embodiment 1 in that two data drivers are used. The same components as those of Embodiment 1 are denoted by the same reference numerals, and the explanation will not be repeated.

The active matrix substrate 2 of Modified Example 3 in FIG. 22 includes two driver ICs 100 for one inspection and protection circuit 15. Therefore, as shown in FIG. 22, the video signal lines 17 of the line groups are routed to form two fan shapes.

Specifically in the active matrix substrate 2 of Modified Example 3, the first line group A, the second line group B, the third line group C, the eighth line group C'y the ninth line group B'y and the tenth line group A'y are arranged in this order between the inspection and protection circuit 15 and the left driver IC 100 when seen from the left side of the sheet of FIG. 22. Moreover, the first line group A', the second line group B', the third line group C', the eighth line group Cy the ninth line group By and the tenth line group Ay are arranged in this order between the inspection and protection circuit 15 and the right driver IC 100 when seen from the left side of the sheet of FIG. 22.

As described above, the line group without the letter y such as "the first line group A" and the line group with the letter y such as "the tenth line group A'y" are positioned symmetrically with respect to the Y axis 01 in FIG. 22. The same is true for the second and ninth line groups B and B'y and the third and eighth line groups C and C'y. Similarly the line group without the letter y such as "the first line group A?" and the line group with the letter y such as "the tenth line group Ay'" are positioned symmetrically with respect to the Y axis 02 in FIG. 22. The same is true for the second and ninth line groups B' and By, and the third and eighth line groups C' and Cy.

The addition of the mark ' (apostrophe) to the line group such as the tenth line group A'y indicates that the line material of the first line portions 17a and the line material of the second line portions 17b in the inner line region Ia are replaced with each other, as compared to the line group without the mark '.

Specifically in the first line group A, the first line portions 17a are made of the second conductive layer and the second line portions 17b are made of the first conductive layer in the inner line region Ia. On the other hand, in the tenth line group A'y that is symmetrical to the first line group A with respect to the Y axis 01 in FIG. 22, the first line portions 17a are made of the first conductive layer and the second line portions 17b are made of the second conductive layer in the inner line region Ia.

With the above configuration, Modified Example 3 can have the same effects as those of Embodiment 1.

Modified Example 4

Figure 23:
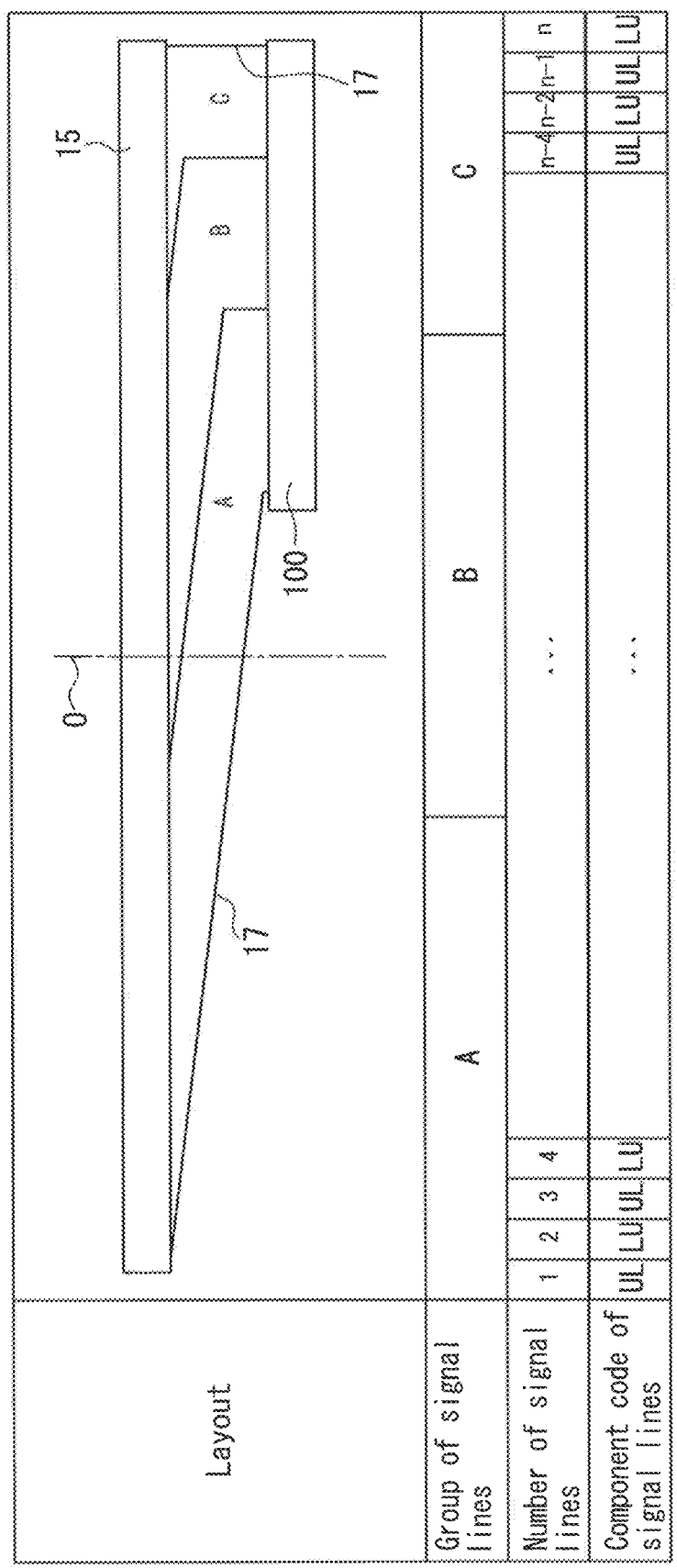
FIG. 23 is a plan view for explaining Modified Example 4 of the layout and wiring structure of video signal lines in the active matrix substrate.

FIG. 23 is a plan view for explaining the layout and wiring structure of the video signal lines in the active matrix substrate.

In FIG. 23, Modified Example 4 mainly differs from Embodiment 1 in that the data driver is displaced with respect to the inspection and protection circuit. The same components as those of Embodiment 1 are denoted by the same reference numerals, and the explanation will not be repeated.

In the active matrix substrate 2 of Modified Example 4, the position of the driver IC 100 is largely shifted to the right side of the sheet of FIG. 23 with respect to the inspection and protection circuit 15. In the active matrix substrate 2 of Modified Example 4, the first line group A, the second line group B, and the third line group C are arranged in this order when seen from the left side of the sheet of FIG. 23.

The position of the driver IC 100 with respect to the inspection and protection circuit 15 is a matter of design choice by a person skilled in the art. However, as shown in FIG. 23, at least three types of line groups, i.e., the first to third line groups A to C are required to route the video signal lines 17 to form a fan shape. The video signal lines 17 described in the present specification are not limited by the position of the driver IC 100 with respect to the inspection and protection circuit 15. Therefore, in the present specification, the video signal lines 17 are laid in the inner line region (line region) Ia so as to belong to any of at least the first to third line groups A to C that are arranged in descending order of interconnection length in the inner line region Ia.

Note that there is a case where it is not necessarily intended to reduce the frame on the terminal side of the liquid crystal display device 1. In this case, the video signal lines constitute only two types of line groups, e.g., the second line group B and the third line group C. In other words, the first line group A is removed from the configuration shown in FIG. 23.

Even in such a case, the inner connection portions 17c that connect the first line portions 17a and the second line portions 17b are not uniformly arranged, but appropriately arranged in accordance with each of the second line group B and the third line group C, as with the embodiments described so far. When the line groups are seen from above in descending order of interconnection length, the inner connection portions 17c of the second line group B are arranged so as to gradually get closer to the matrix region H, and the inner connection portions 17c of the third line group C are arranged so as to gradually move away from the matrix region H.

In the configuration of FIG. 23, from which the first line group A is simply removed, the bending points of the lines of the second line group B are away from the driver IC 100. As a result, an empty space is formed between the second line group B and the driver IC 100. This empty space may be used for other purposes such as an area for the arrangement of marks or other electrodes. If the objective of a person skilled in the art is satisfied, the wiring of the present invention can be applied to produce an empty space rather than to directly reduce the frame on the terminal side. In view of the fact that another area for the arrangement of marks or the like is not necessary this configuration still has the effect of preventing an increase in the frame on the terminal side. Therefore, this configuration indirectly contributes to a reduction in the frame on the terminal side.

When the empty space is reduced to make the inspection and protection circuit 15 closer to the driver IC 100, the whole line group is reconstructed. The resulting configuration includes three types of line groups, i.e., the first line group A, the second line group B, and the third line group C, which is shown in FIG. 23.

With the above configuration, Modified Example 4 can have the same effects as those of Embodiment 1.

The above embodiments are all illustrative and not restrictive. The technical scope of the present invention is defined by the appended claims, and all changes that come within the range of equivalency of the claims are intended to be embraced therein.

In the above description, e.g., the present invention is applied to the transmission type liquid crystal display device. However, the active matrix substrate of the present invention is not limited thereto, and may be applied to all types of display devices as long as they have a display region with a plurality of pixels, and lines for transmitting signals to drive the pixels. The present invention may be applied to, e.g., EL displays, plasma displays, electronic ink paper, microcapsule-type electrophoretic display devices, or other display devices. In the microcapsule-type electrophoretic display devices, e.g., a voltage is applied to a microcapsule layer formed in a display region on a pixel-by-pixel basis, so that an image is displayed. The display devices may include a substrate including, e.g., lines that are connected to pixel electrodes via switching elements for each pixel in a display region, and lead lines that are connected to the lines in the display region. This substrate can be configured to be, e.g., the active matrix substrate of the above embodiments. In addition to these display devices, the active matrix substrate of the present invention may be applied to various sensor substrates such as a sensor substrate for an X-ray detector.

In the above description, each of the video signal lines (signal lines) includes the inner line portion and the outer line portion. The inner line portion includes the first line portion, the second line portion, and the inner connection portion. The outer line portion includes the outer line that is connected to the second line portion via the outer connection portion and also connected to the terminal. However, the present invention is not limited to this configuration. There is no particular limitation to the present invention as long as a plurality of signal lines are laid in the line region between the matrix region and the terminal region so that the line pitch becomes narrower in the direction from the matrix region to the terminal region (i.e., the line region in which the signal lines are routed to converge in a fan shape), each of the signal lines includes the first line portion, the second line portion, and the connection portion that connects the first line portion and the second line portion, and the second line portion is connected to the terminal.

In the above description, the position of the inner connection portion of each of the video signal lines is determined so that that the length of the first line portion is equal to that of the second line portion. However, the present invention is not limited thereto, and may have any configuration as long as the position of the connection portion of each of the signal lines is determined in accordance with the layout position of that signal line in the line region. In other words, the present invention may have a configuration in which a plurality of signal lines are laid with the line pitch becoming narrower, and a change in resistance of two adjacent signal lines is small even if each of the signal lines includes two conductive layers that differ in sheet resistance. Moreover, the present invention may preferably have a configuration in which a change in resistance of two adjacent signal lines is small so that no display unevenness is visually identified when the active matrix substrate of the present invention is used, e.g., in a display device.

However, as described in the above embodiments, the positioning of the connection portion so as to make the length of the first line portion equal to that of the second line portion of each of the signal lines is preferred because two adjacent signal lines of the signal lines can have the same resistance.

In the above description, the signal lines are video signal lines connected to the data lines. However, the present invention is not limited thereto, and the signal lines may be connected to gate lines (scanning lines).

However, as described in the above embodiments, the use of the video signal lines is preferred because it is easy to reduce the size of the data driver that is to be connected to the video signal lines, and also to reduce the power consumption of a display device using this active matrix substrate.

In the above description, the data driver is composed of the driver IC, and the gate driver is monolithically formed on the base material of the active matrix substrate. However, the present invention is not limited thereto, and may have a configuration in which, e.g., the data driver and the gate driver are integrally formed of a driver IC (driver chip), or the data driver and the gate driver are formed of different driver ICs, respectively.

In the above description, the first line portion is made of the same conductive layer as one of the data line and the scanning line, and the second line portion is made of the same conductive layer as the other of the data line and the scanning line. However, the present invention is not limited thereto, and each of the first line portion and the second line portion may be made of a conductive layer that is different from the data line or the scanning line.

However, as described in the above embodiments, the first line portion made of the same material as one of the data line and the scanning line, and the second line portion made of the same material as the other of the data line and the scanning line are preferred because it is possible to prevent an increase in the number of manufacturing processes of the active matrix substrate.

INDUSTRIAL APPLICABILITY

The present invention is useful for an active matrix substrate in which a plurality of signal lines are laid with the line pitch becoming narrower, and a change in resistance of two adjacent signal lines is small even if each of the signal lines includes two conductive layers that differ in sheet resistance, and a display device using the active matrix substrate.

DESCRIPTION OF REFERENCE NUMERALS

1 Liquid crystal display device (display device)
2 Active matrix substrate
7 Thin film transistor
8 Pixel electrode
17 Video signal line (signal line)
17a First line portion
17b Second line portion
17c Inner connection portion (connection portion)
17d Outer connection portion
17dd (Dummy) outer connection portion
17e Outer line
A, Ay A'y First line group
B, By, B'y Second line group
C, Cy C'y Third line group
D, D1 to DM Data line (source line)
G, G1 to GN Gate line (scanning line)
P Pixel
H Matrix region (effective display region)
T Terminal
Ta Terminal region

The invention claimed is:
1. An active matrix substrate comprising:
a plurality of data lines and a plurality of scanning lines that are arranged in a matrix;
a plurality of switching elements that are provided on each at a corresponding crossing of the plurality of data lines with the plurality of scanning lines; and
a plurality of pixels that include pixel electrodes connected to the plurality of switching elements, wherein
a plurality of terminals are provided to input external signals to the plurality of data lines or the plurality of scanning lines,
a plurality of signal lines are defined in a line region between a matrix region in which the plurality of data lines and the plurality of scanning lines are arranged in the matrix and a terminal region in which the plurality of terminals are arranged, and the line region is defined so that a line pitch becomes narrower in a direction from the matrix region to the terminal region,
one end of each of the plurality of signal lines is connected to drive the data line or the scanning line, and the other end is connected to one of the plurality of terminals,
each of the plurality of signal lines includes a first line portion provided on a matrix region side, a second line portion provided on a terminal region side, and a connection portion that connects the first line portion and the second line portion,
the first line portion and the second line portion of one of two adjacent signal lines of the plurality of signal lines are made of a first conductive layer and a second conductive layer, respectively, which are different from each other, and the first line portion and the second line portion of the other of the two adjacent signal lines are made of the second conductive layer and the first conductive layer, respectively,
a position of the connection portion of each of the plurality of signal lines is determined in accordance with a layout position of the respective signal line in the line region, the plurality of signal lines are in a first line group in which the connection portions connecting the first line portions and the second line portions have a pitch Pbi and in a second line group in which the connection portions have a pitch Pci that is smaller than the pitch Pbi, the first line group is located adjacent to the second line group, and a first line of the first line group adjacent to the first line portions of the second line group and a second line of the second line group adjacent to the first line portions of the first line group extend parallel to each other.

2. The active matrix substrate according to claim 1, wherein the second line portions of the lines of the first line group include portions that extend parallel to a direction in which the first line portions of the first line group extend.

3. A display device comprising the active matrix substrate according to claim 2.

4. The active matrix substrate according to claim 1, wherein the second line portions of the lines of the second line group extend in a direction at right angles to one side of the matrix region.

5. A display device comprising the active matrix substrate according to claim 4.

6. A display device comprising the active matrix substrate according to claim 1.

7. The active matrix substrate according to claim 1, wherein
   the first line portions of the plurality of signal lines include a same conductive layer and have a same or substantially a same width and spacing from adjacent ones of the first line portions, and
   the second line portions of the plurality of signal lines include a same conductive layer and have a same or substantially a same width and spacing from adjacent ones of the second line portions.

8. The active matrix substrate according to claim 1, wherein
   the first line portions of the plurality of signal lines extend parallel or substantially parallel to each other, and
   the second line portions of the plurality of signal lines extend parallel or substantially parallel to each other.

* * * * *